(12) United States Patent
Klemen et al.

(10) Patent No.: US 6,743,135 B2
(45) Date of Patent: Jun. 1, 2004

(54) MODULARLY-CONSTRUCTED VEHICULAR TRANSMISSIONS

(75) Inventors: Donald Klemen, Carmel, IN (US); Michael Roland Schmidt, Carmel, IN (US); Ahmed Mostafa El-Antably, Indianapolis, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/098,015

(22) Filed: Mar. 13, 2002

(65) Prior Publication Data

US 2003/0064846 A1 Apr. 3, 2003

(51) Int. Cl.[7] ............................ F16H 3/72; F16H 37/06; B60K 1/00; B60K 6/00
(52) U.S. Cl. ........................... 475/5; 180/65.2; 180/65.7
(58) Field of Search ................... 475/5, 1, 149; 477/2, 3; 180/65.2, 65.6, 65.7; 74/606 R

(56) References Cited

U.S. PATENT DOCUMENTS

| | | | | | |
|---|---|---|---|---|---|
| 5,396,968 A | * | 3/1995 | Hasebe et al. | ............. | 180/65.6 |
| 5,558,588 A | * | 9/1996 | Schmidt | .................. | 475/5 |
| 5,931,757 A | * | 8/1999 | Schmidt | .................. | 475/2 |
| 6,022,287 A | * | 2/2000 | Klemen et al. | ............. | 475/5 |
| 6,358,173 B1 | * | 3/2002 | Klemen et al. | ............. | 475/5 |

* cited by examiner

Primary Examiner—Tisha D Lewis
(74) Attorney, Agent, or Firm—Leslie C. Hodges

(57) ABSTRACT

A procedure to assemble a vehicular transmission from modular components. One determines the type of transmission to be assembled within a prefabricated housing sub-assembly, and then selects a central shaft sub-assembly from a family of modular shaft assemblies. A modular shaft sub-assembly appropriate to the transmission to be assembled is selected and then operatively connected to the housing sub-assembly to provide a housing assembly. An input sub-assembly is selected and operatively connected to the housing assembly. An output sub-assembly is selected from a family of modular output sub-assemblies, the selected output sub-assembly to be appropriate to the transmission to be assembled. The selected output subassembly is operatively connected to the housing assembly to provide a transmission of the type desired.

14 Claims, 17 Drawing Sheets

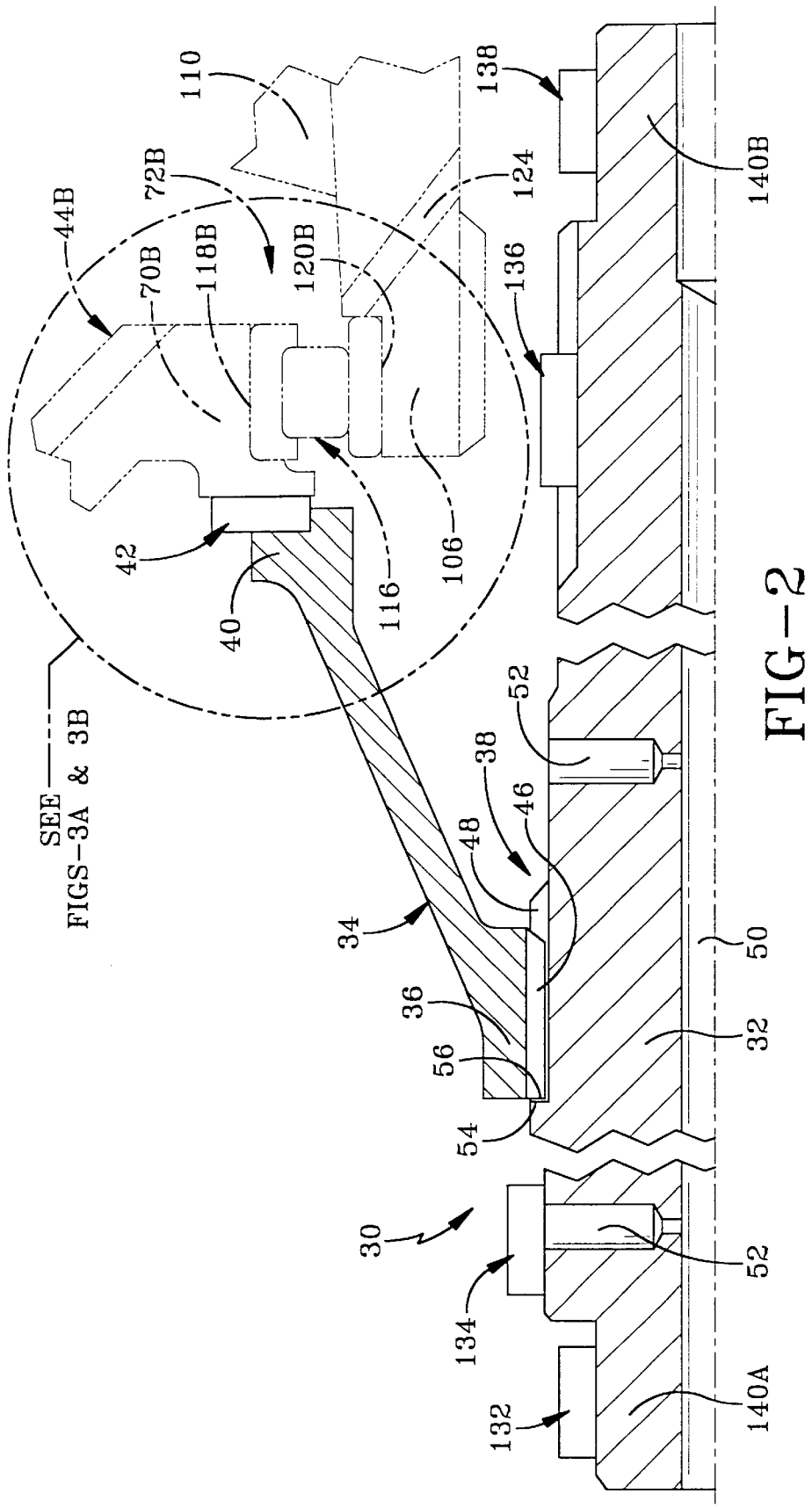

MODULARLY-CONSTRUCTED VEHICULAR TRANSMISSIONS

TECHNICAL FIELD

The present invention relates generally to the assembly of transmissions to be employed in vehicular powertrains. More particularly, the present invention relates to the assembly of transmissions of various types from modular components. Specifically, the present invention relates to vehicular transmissions that can be assembled from a modular housing assembly, a modular input assembly and a modular output assembly that are selected from several such available assemblies such that the resulting transmission may be tailored to predetermined operational parameters, i.e., to the specific use, or uses, to which the vehicle in which that transmission will be incorporated is to be primarily employed.

BACKGROUND OF THE INVENTION

The purpose of a vehicular powertrain is to transmit the power delivered by an internal combustion engine, and/or an electric motor, to the output drive shaft emanating from the transmission. Transmissions typically provide a neutral, at least one reverse and one or more forward driving ranges that impart power from an engine, and/or other power sources, to the drive members that deliver the tractive effort from the vehicle to the terrain over which the vehicle is being driven. As such, the drive members may be front wheels, rear wheels or a track, as required to provide the desired performance.

Although a wide variety of transmission types are known to the art that are capable of receiving the output power from either an engine or an electric motor, or both, in order to operate at high efficiencies during various operating conditions, no single transmission configuration is most favorable for all operating conditions.

It is, therefore, the intent of the present invention to provide a means by which the manufacturer of vehicular transmissions can vary the selection of interfitting modular components in order to facilitate the ease of assembly and reduce the costs of manufacturing various transmission permutations in order to accommodate the operating parameters of vehicles in which the transmissions are to be employed.

For example, it may be desired, if not required, that some vehicles—such as transit buses—operate at a high average speed. To the contrary, other vehicles—such as shuttle buses—operate at low average speeds. Hence, the manufacturer of such vehicles is faced with the dilemma that no one prior art transmission is most efficiently adapted to accommodate both desired operating parameters. For example, the low average speed shuttle bus has a low power consumption as compared to the high average transit vehicle, and the shuttle bus is typically required to make many more stops during its normal operating cycle. In addition, the shuttle bus often operates in geographic locations where emissions must comport with stringent environmental considerations. The usage of electrical energy to power such vehicles can be a significant plus inasmuch as the use of electrical energy to power a vehicle accommodates not only environmental restrictions but also numerous start/stop cycles. To employ comparable storage and usage of electrical energy as the sole source of energy for transit buses, however, might well be uneconomical, even though using only an internal combustion engine would very likely result in an undesirable higher emissions output. Hence, in some circumstances, it may be desirable to utilize a simple series generator-motor combination with which an onboard internal combustion engine may be selectively employed solely to charge a device for storing electrical energy.

By and large, therefore, the vast majority of vehicular, operational parameters can be satisfied by selecting a transmission from a group of transmission types, such as: a simple "series" generator-motor assembly that does not include a mechanical path between the internal combustion engine and the transmission output shaft; a single-mode, input-split transmission; a single-mode, compound-split transmission; and a dual-mode, compound-split transmission. All of the foregoing transmission types are well known to those skilled in this art, but heretofore it has not been convenient selectively to construct any one of the foregoing transmission types from a plurality of modular assemblies— viz.: from a selected housing assembly comprised of a common housing sub-assembly and a selected central shaft sub-assembly; a selected input assembly; and a selected output assembly.

SUMMARY OF THE INVENTION

It is, therefore, one primary aspect of the present invention to provide a new and novel modular technique for assembling a family of vehicular transmissions, including a simple "series" generator-motor assembly that does not include a mechanical path between the internal combustion engine and the transmission output shaft; a single-mode, input-split transmission; a single-mode, compound-split transmission; and a dual-mode, compound-split transmission.

It is another aspect of the present invention to provide a modular assembly technique, as above, wherein three assemblies are required selectively to fabricate any one of the aforesaid family of transmissions—the assemblies including a plurality of housing assemblies, a pair of input assemblies and a plurality of output assemblies as well as a choice of one from at least two central shaft sub-assemblies operatively received within a common housing sub-assembly.

It is a further aspect of the present invention to provide a modular assembly technique, as above, whereby even the modular assemblies may comprise a plurality of modular components which may be employed in more than one assembly variation.

These and other aspects of the invention, as well as the advantages thereof over existing and prior art forms, which will be apparent in view of the following detailed specification, are accomplished by means hereinafter described and claimed.

By way of a general introductory description, the assembly of a desired electric variable transmission included within a plurality of transmission types can be accomplished by selecting and connecting modular assemblies that have themselves been previously assembled in conformity with the concepts of the present invention.

BRIEF DESCRIPTION OF THE DRAWINGS

FIG. 2 is a longitudinal cross section of a central shaft subassembly that, with specifically described variations selectively employed to determine whether the housing assembly, as depicted in FIG. 1, will be appropriate for the simple, generator-motor transmission or the single-mode, input-split transmission, said cross section being taken along a plane that bisects a longitudinal portion of the central shaft and a portion of a linking member adapted to be mounted on said central shaft, with a portion of a shroud and a connecting hub on one rotor support ring which operatively engage the linking member being depicted in phantom;

DESCRIPTION OF THE PREFERRED EMBODIMENT

One Form of a Modular, Tube-Like, Annular, Housing Assembly

Figure 1:
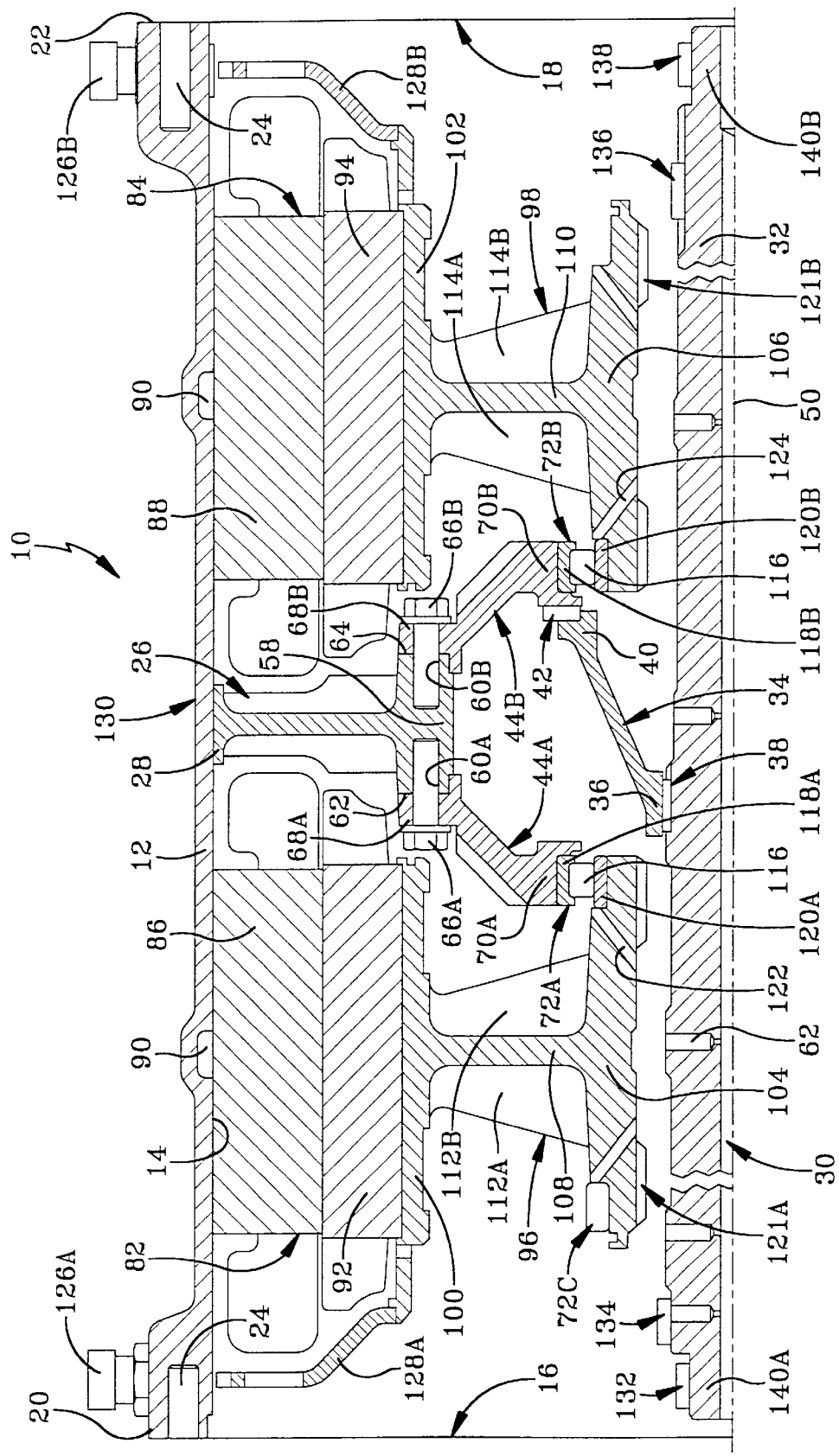
FIG. 1 is a longitudinal cross section of one form of a housing assembly particularly adapted (by appropriate selection of a transverse interface) for use in the assembly of not only a simple, generator-motor transmission that does not employ a mechanical connection between the input and output shaft members but also a single-mode, input-split transmission, said cross section being taken along a plane that extends radially outwardly from the centerline of that assembly.

With particular reference to FIG. 1, it will be observed that the housing assembly depicted therein, and identified generally by the numeral 10, is circumscribed by a hollow, tube-like, annular casing 12 with a generally cylindrical inner surface 14 that terminates in first and second axially-spaced open ends 16 and 18 that are, in turn, defined by respective circular rims 20 and 22. Each rim 20 and 22 presents a plurality of circumferentially spaced, preferably threaded, bores 24 utilized when securing input and output assemblies to the housing assembly, as will be more fully hereinafter described.

The housing assembly 10 includes a transverse partition 26 that is secured within the medial portion of the annular casing 12. Securing the partition 26 within the casing 12 may be expedited by providing the partition 26 with a radially outer, mounting rim 28 adapted to be secured to the generally cylindrical inner surface 14 of the casing 12 in such a manner as to preclude rotational movement and/or axial displacement of the partition 26 relative to the casing 12 once the partition 26 is secured therein. The specific manner by which the partition 26 is secured is not critical. The radially outer, mounting rim 28, for example, may be mechanically secured as by screws (not shown) that penetrate the hollow, tube-like casing 12 to be anchored within the radially outer mounting rim 28, either alone or in combination with a mated fluting interface (also not shown) between the radially outer mounting rim 28 and the generally cylindrical inner surface 14 of the casing 12. Alternatively, of course, the radially outer mounting rim 28 on the transverse partition 26 may be welded to the cylindrical inner surface 14 of the casing 12.

Figure 3A:
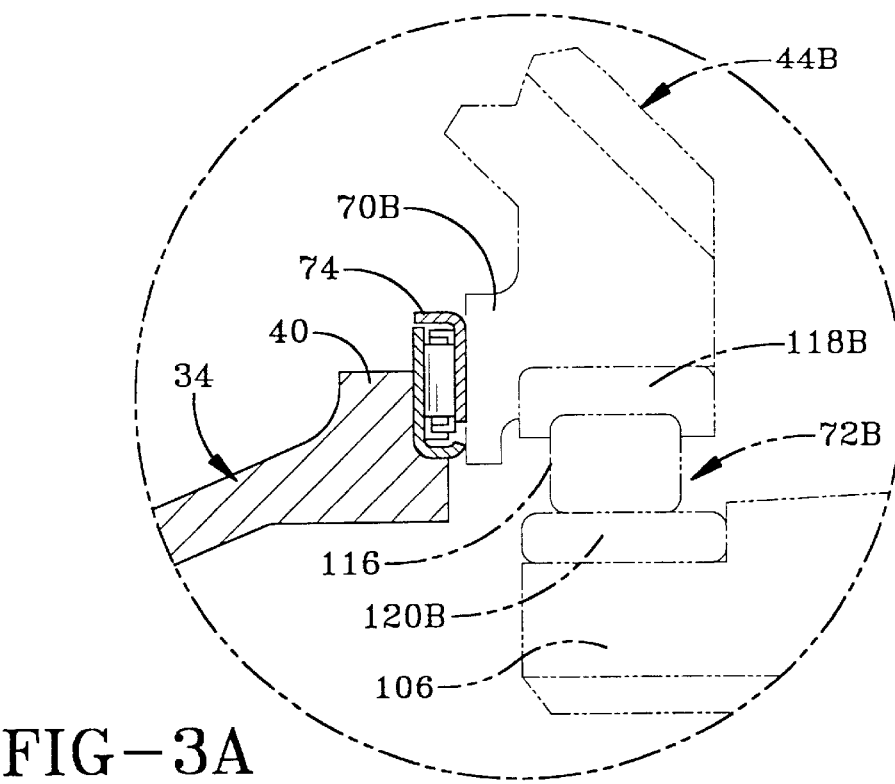
FIG. 3A is an enlargement of that portion of FIG. 2 delineated by the chain-line circle designated as "SEE FIGS. 3A & 3B" and depicting that form of a transverse interface which permits relative rotation between the opposed linking member and shroud separated by said transverse interface, as required for assembling a single-mode, input-split transmission.
Figure 3B:
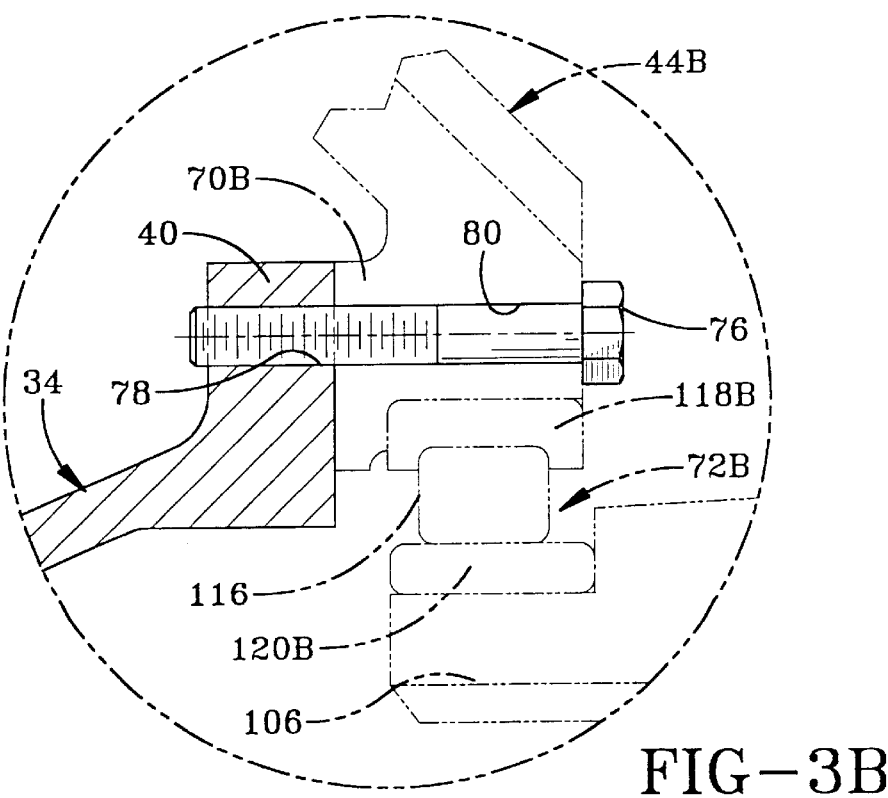
FIG. 3B is an enlargement of that portion of FIG. 2 delineated by the chain-line circle designated as "SEE FIGS. 3A & 3B" and depicting that form of a transverse interface which precludes relative rotation between the opposed linking member and shroud separated by said transverse interface, as required for assembling a simple "series" generator-motor transmission.

With the partition 26 in place, one may insert the desired variation of the central shaft sub-assembly 30 best depicted in FIGS. 2, 3A and 3B appropriate for the transmission being assembled. The central shaft sub-assembly 30 includes a central shaft 32 and a conically flared stabilizer or linking member 34. The linking member 34 has a radially inner, annular, locating flange 36 that presents an annular, positive drive, mechanical interface 38 which operatively engages the central shaft 32.

The conical, linking member 34 flares radially outwardly from the locating flange 36 to terminate in a radially outer reaction flange 40 that presents a transverse, mechanical interface 42 (represented schematically in FIGS. 1 and 2) which operatively engages shroud 44B of the two shrouds 44A and 44B secured to the partition 26. The shrouds 44A and 44B are both hereinafter more fully described.

As apparent from the previous paragraph, a particular structural member, component or arrangement may be employed at more than one location. When referring generally to that type of structural member, component or arrangement, a common numerical designation is employed. However, when one of the structural members, components or arrangements so identified is to be individually identified, it will be referenced by virtue of a letter suffix employed in combination with the numerical designation employed for general identification of that structural member, component or arrangement. Hence, there are two shrouds that are generally identified by the numeral 44. However, the specific, individual shrouds are, therefore, identified as 44A and 44B in the specification and on the drawings. This same suffix convention shall be employed throughout the specification.

As best seen in FIG. 2, the mechanical, positive drive interface 38 may comprise splines 46 that project radially inwardly of the annular locating flange 36 and extend axially along the cylindrical interior of the locating flange 36 operatively to engage corresponding, opposed, axially extending grooves 48 in the central shaft 32. The aforesaid engagement of the splines 46 within the grooves 48 serves to preclude relative rotation of either member—viz.: the central shaft 32 or the linking member 34—of the central shaft sub-assembly 30 with respect to the other. Although other structural arrangements can be employed to preclude relative rotation, the foregoing approach is preferred inasmuch as it also allows the central shaft 32 itself to be utilized in transmissions that do not require, or utilize, the linking member 34, as will hereinafter become apparent.

Moreover, the presence of the shaft 32 in the transmission, even when the shaft 32 is grounded against rotation, provides a distribution means for lubricating and cooling fluid. That is, such fluid can be pumped through the bore 50 that extends axially within shaft 32 to be distributed outwardly through a plurality of radial ports 52, as is well known to the art.

In addition to assuring either the desired rotation, or rotational grounding of the central shaft 32, one of the primary additional functions to be achieved by the stabilizer or linking member 34 is to serve as an axial locator for the central shaft 32. That is, the mechanical interface 38 serves not only to effect simultaneous rotation with, or grounding of, the central shaft 32 and the linking member 34 but also to delineate the extent to which the central shaft 32 can be axially displaced in at least one direction relative to the linking member 34 - viz.: the extent to which the shaft 32 can be axially translated to the right as viewed in FIG. 2. To the contrary, the central shaft 32 is not restricted from being displaced axially to the left as viewed in that figure. Such a result is readily accomplished with the mechanical interface 38 by incorporating a pair of opposed, transversely disposed shoulders, as defined by the transverse ends 54 of the splines 46 as they matingly engage the opposed transverse ends 56 of the axial grooves 48, as depicted in FIG. 2. This arrangement freely accommodates replacement of either the shaft 32 or the linking member 34.

It must, as previously noted herein, be appreciated that rotation of the central shaft 32 is either permitted or precluded by the linking member 34. Such a result may be readily accomplished with the selection of an appropriate transverse, mechanical interface 42. However, before proceeding with a discussion of the transverse interface 42, the description of the partition 26 should be concluded.

As best seen from FIG. 1, the radially inner extent of the partition 26 terminates in an anchor rim 58, and a plurality of threaded bores 60A and 60B may be circumferentially spaced along the axially spaced, transverse surfaces 62 and 64, respectively, of the anchor rim 58. The threaded bores 60 in transverse surface 62 receive the mounting bolts 66A that secure the radially outer mounting flange 68A on the first conically flared shroud 44A to the partition 26. The threaded bores 60B in transverse surface 64 receive the mounting bolts 66B that secure the radially outer mounting flange 68B on the second conically flared shroud 44B to the partition 26.

The conically flared shrouds 44A and 44B each taper axially away from the partition 26 as they extend radially inwardly from their respective mounting flanges 68A and 68B to their respective terminal flanges 70A and 70B. Bearing means 72A and 72B are located at the radially inner extent of the respective terminal flanges 70A and 70B, and the purpose of each bearing means 72 is hereinafter more fully described.

Returning now to the transverse, mechanical interface 42 (represented schematically in FIGS. 1 and 2 and diagrammatically in FIGS. 3A and 3B), it should be appreciated that the primary function of that interface is to determine whether the linking member 34 is, or is not, permitted to rotate relative to shroud 44B that is grounded to the annulus 12 through partition 26. In at least one transmission type that can be readily, and modularly, assembled pursuant to the concepts of the present invention it will be desired that rotation of the central shaft sub-assembly 30 be permitted. That result can be readily accomplished by having the transverse interface 42 comprise a well-known thrust bearing 74 that is interposed between the reaction flange 40 on the linking member 34 and the terminal flange 70B on shroud 44B, as depicted in FIG. 3A.

However, when it is desired that the central shaft sub-assembly 30 be secured against rotation (as when assembling a simple series, generator-motor transmission that will be hereinafter more fully described), the transverse interface 42 must effect a ground between the linking member 34 and the shroud 44B. An appropriate transverse interface 42, as represented in FIG. 3B, will effect this result and comprises, for example, the use of one or more bolts 76 that are secured within opposed bores 78 and 80 in the respective reaction flange 40 in linking member 34 and the annular terminal flange 70B of shroud 44B as by threading the interior of bore 78 matingly to engage each bolt 76. One could, of course, substitute nut and bolt combinations, or even a locking clips, in lieu of the bolts 76.

When assembling any transmission that employs the linking member 34, the specific configuration of the interface 42 may impact on the decision as to whether it will be most convenient to insert the central shaft sub-assembly 30 from the first open end 16 or the second open end 18 of casing 12.

In those situations where the transverse interface 42 selected is that which precludes rotation of the central shaft 32, it may be more convenient to secure the linking member 34 to shroud 44B prior to anchoring the shroud 44B to the partition 26. In this situation, it may be more convenient to insert the connected linking member 34 and shroud 44B from the second open end 18 of casing 12, and then anchor the shroud 44B to the partition 26 prior to insertion of the shaft 32 through the annular locating flange 36.

However, when assembling transmissions employing the linking member 34 that rotates with the central shaft 32, the shroud 44B may be secured to the partition 26 either before or after the central shaft sub-assembly 30 is positioned within the casing 12.

Referring once again to FIG. 1, with the partition 26 and the conically flared shrouds 44A and 44B in place, first and second motor/generators 82 and 84, respectively, may be positioned within the casing 12, one on either axial side of the partition 26. The stators 86 and 88 of the respective motor/generators 82 and 84 may then be secured to the generally cylindrical interior surface 14 of the annulus 12 in a manner such as was described to secure the partition 26. It should be noted that the generally cylindrical interior surface 14 of the casing 12 may be interrupted by one or more radially outwardly extending, annular offsets 90 to facilitate the circulation of lubricating and cooling fluids, particularly behind the stators 86 and 88, as is well known to the art.

The customary electrical windings of the rotors 92 and 94 for the respective first and second motor/generators 82 and 84 are secured to annular supporting rings 96 and 98, respectively. The supporting rings 96 and 98 each have a radially outer, annular support rim 100 and 102, respectively, on which the electrical windings of the respective rotors 92 and 94 are directly mounted. The radially inner portion of each ring 96 and 98 is defined by a respective annular connecting hub 104 and 106.

A radially extending web plate 108 secures the radially outer, annular support rim 100 to the radially inner connecting hub 104 of ring 96, and a similar web plate 110 secures the radially outer support rim 102 to the radially inner connecting hub 106 of ring 98. A plurality of haunch plates 112A and 112B are circumferentially spaced along each side of the web plate 108 to extend between the radially outer, annular support rim 100 and the radially inner, connecting hub 104 of support ring 96. A similar plurality of haunch plates 114A and 114B are circumferentially spaced along each side of the web plate 110 to extend between the radially outer, annular support rim 102 and the radially inner, connecting hub 106 of support ring 98.

The inner connecting hubs 104 and 106 of the respective supporting rings 96 and 98 cooperatively interact with the respective bearing means 72A and 72B. The bearing means 72 may utilize sleeve bearings or, as shown, a plurality of roller bearings 116 operatively received against bearing races 118A and 118B presented, respectively, from the radially inboard end of the terminal flanges 70A and 70B on the conically flared shrouds 44A and 44B. The races 118A and 118B are opposed to the bearing races 120A and 120B presented from the radially outer surface on each respective connecting hub 104 and 106 of the supporting rings 96 and 98. Mechanical interfaces 121A is provided on the radially inner side of connecting hub 104, and a mechanical interface 121B is provided on the radially inner side of connecting hub 106—both for purposes hereinafter explained in conjunction with the modular assembly of selected transmissions.

The bearing means 72 contribute to the rotational stabilization of the rotors 92 and 94 in motor/generators 82 and 84, and in order to assure the desired lubrication of the bearing means 72A and 72B a feeder passage 122 penetrates the connecting flange 104 and a similar feeder passage 124 penetrates the connecting hub 106, as is well known to the art.

Irrespective of which transverse interface 42 is utilized, the housing assembly 10 may also include sensors 126A and 126B which provide information as to the rotational speed of the rotors 92 and 94, respectively. The use of such information is well know to those skilled in this art and need not, therefore, be explained herein. The rotational speed of each rotor 92 and 94 may, as is also well known to the art, be mechanically fed to the appropriate sensor 126A or 126B by means of actuating dishes 128A and 128B that are secured to the respective support rings 96 and 98.

To recap, it should be understood that the casing 12, the partition 26, the shrouds 44, the motor/generators 82 and 84, including the respective mounting rings 96 and 98, comprise a housing sub-assembly 130. Only when the selected variation of the central shaft sub-assembly 30 is positioned within the housing sub-assembly 130 is the housing assembly 10 ready operatively to receive the selected input and output assemblies, as will be hereinafter described in detail.

It should be noted that in order for the shaft 32 to be employed in the various transmission types there are four additional annular, mechanical interfaces—viz.: 132, 134, 136 and 138 appropriate to the shaft 32 that need to be considered when selecting the appropriate configuration for the shaft 32 itself. As best seen in FIGS. 1 and 2, the interface 132 is located in proximity to the left end (as viewed in FIGS. 1 and 2) of the shaft 32 on a pilot extension 140A that will interact with the input assembly selected for the type transmission to be assembled. The interface 134 is located on the central shaft 32 just inboard of the pilot extension 140A and will interact with any planetary gear subset incorporated in an input assembly as hereinafter described.

Similarly, the interface 136 is located on shaft 32 in proximity to the pilot extension 140B. So located, interface 136 will interact with one or more components in the output assembly selected for the type transmission to be assembled. The interface 138 is located on the pilot extension 140B and, as such, will effect, at least in part, the desired interaction between the pilot extension 140B and the hereinafter described output shaft provided by the output assembly selected to assemble the desired type of transmission, as is also hereinafter also described.

Before embarking on a description of the various input and output assemblies, a second housing assembly 142 should be described. This housing assembly 142 is another form of a modular, tube-like, annular, housing assembly.

Figure 4:
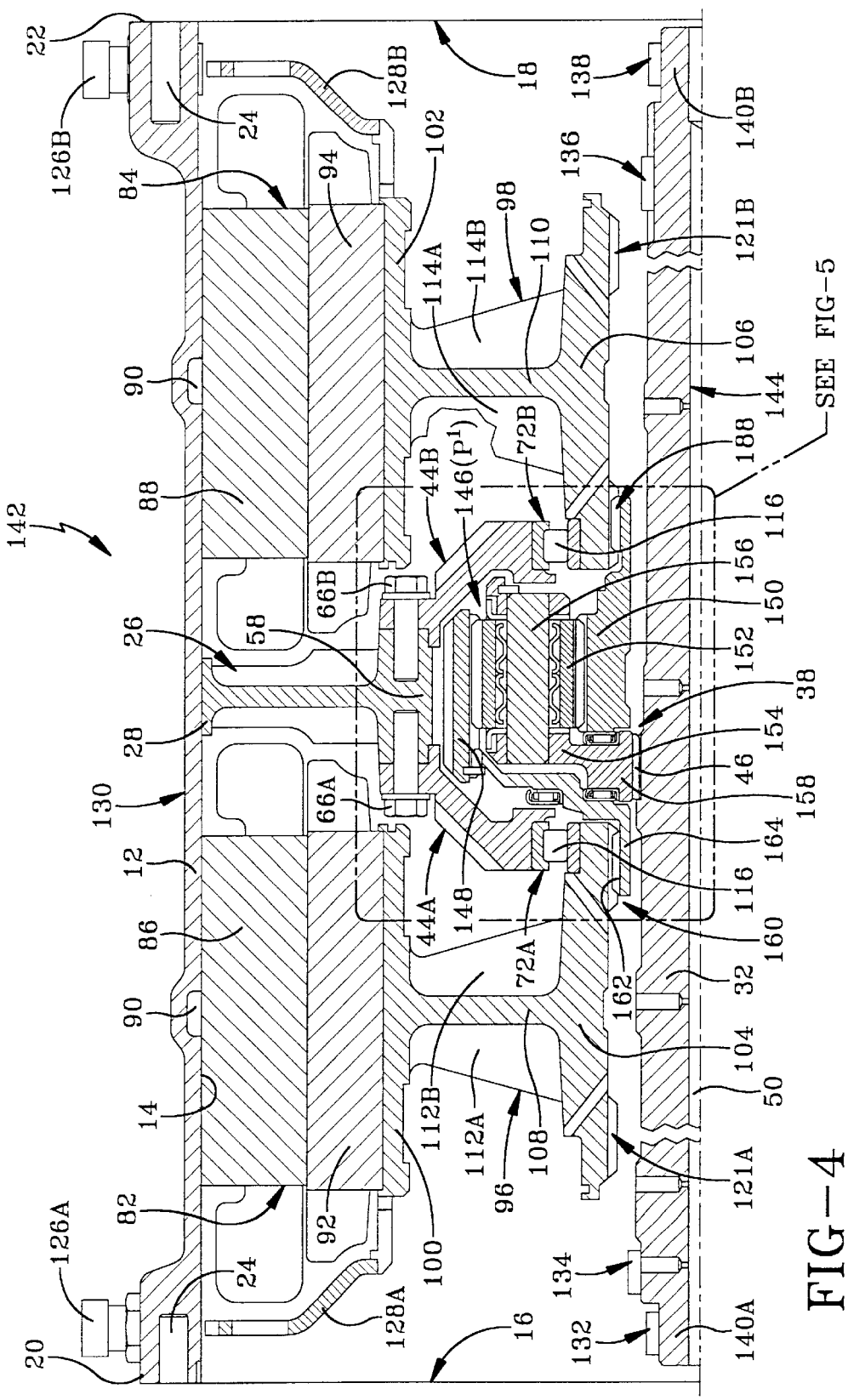
FIG. 4 is a longitudinal cross section of another form of a housing assembly particularly adapted for use in the assembly of not only a single-mode, compound-split transmission but also a dual-mode, compound-split transmission, said cross section being taken along a plane that extends radially outwardly from the centerline of that sub-assembly.
Figure 5:
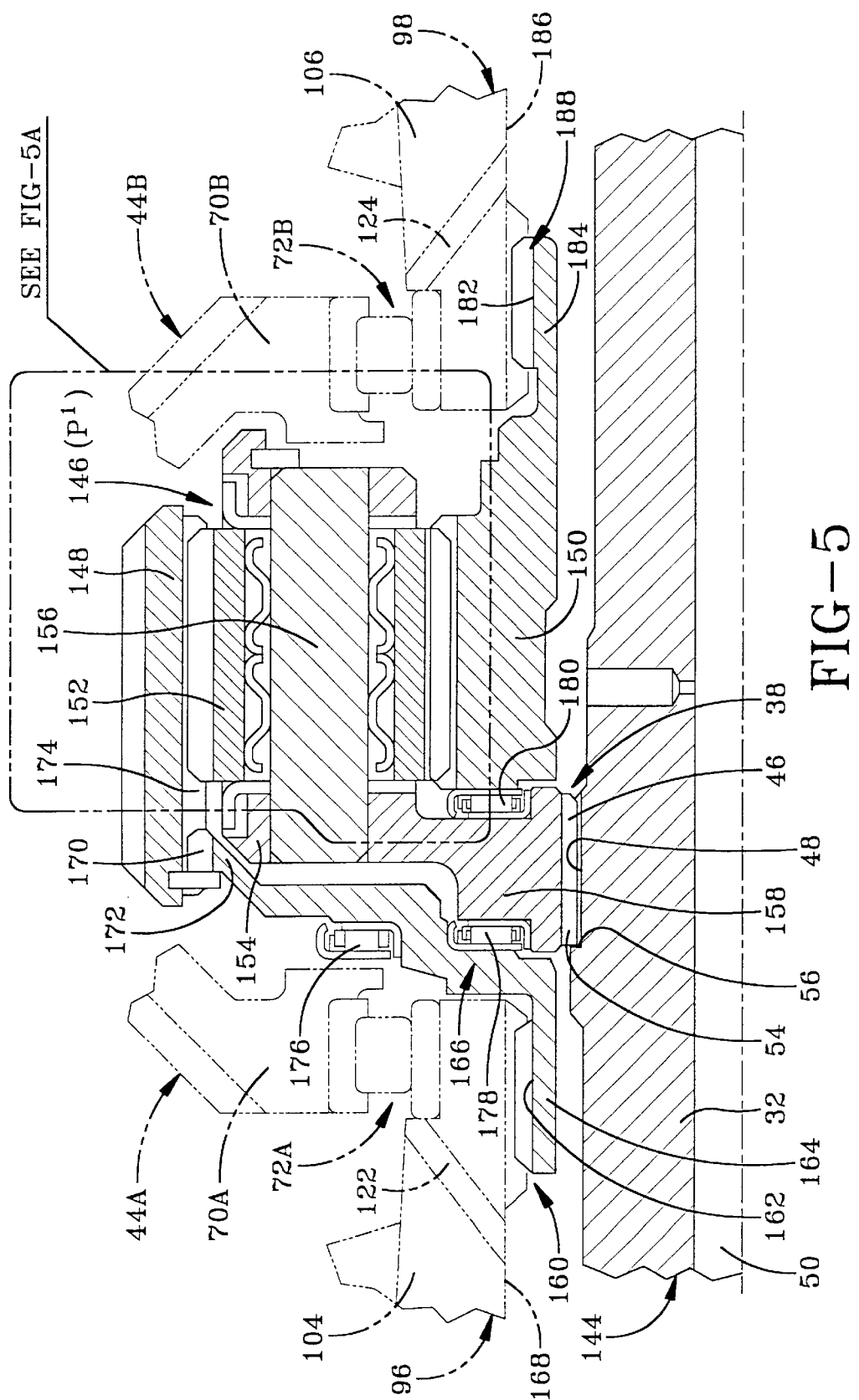
FIG. 5 is an enlargement of that portion of FIG. 4 delineated by the chain-line rectangle designated as "SEE FIG. 5" and depicting an enlarged representation of the planetary gear subset shown in FIG. 4, with a portion of the shrouds (and the connecting hubs on the rotor support rings operatively engaging a respective shroud) that axially straddle said planetary gear subset being depicted in phantom.

With particular reference to FIGS. 4 and 5, it will be observed that a second housing assembly, identified generally by the numeral 142, differs from the housing assembly 10 previously described herein primarily in that a central shaft sub-assembly 144 provided within housing assembly 142 employs a planetary gear subset 146 rather than a linking member 34, as depicted in FIGS. 1 and 2. The same housing sub-assembly 130 is readily utilized by both housing assemblies 10 and 142.

The planetary gear subset 146 has an outer gear member 148, that may generally be designated as the ring gear, which circumscribes an inner gear member 150, generally designated as the sun gear. A plurality of planet gear members 152 are rotatably mounted on a carrier 154 such that each planet gear 152 simultaneously, and meshingly, engages both the outer, ring gear member 148 and the inner, sun gear member 150 of planetary gear sub-set 146.

A planetary gear subset is utilized in some central shaft sub-assemblies, in all input assemblies and in some output assemblies. Rather than describe every planetary gear subset in painstaking detail, it should be understood that the planetary gear subsets utilized in the present invention are of two distinct variations with additional variations as to the structure by which each gear member is operatively connected to the structure with which each particular planetary gear subset interacts with other structural members within the transmission.

Specifically, the planet gear members 152 in planetary gear subset 146, as well as each of the other planetary gear subsets, are each rotatably mounted on their own individual mounting shaft 156 presented from the carrier 154. The diameter of each planet gear mounting shaft 156 is, as well known to those skilled on this art, commonly calculated to carry the loads imposed thereon, and depending on the type of transmission to be assembled, the planetary gear mounting shafts in one or more planetary gear subsets may, therefore, need only be of a relatively small diameter, as represented by shaft 156 depicted in FIGS. 4 and 5, or of a relatively larger diameter, as represented by shaft 156' depicted in FIG. 5A. To facilitate rapid identity, those planetary gear subsets using the smaller diameter planet mounting shafts 156 shall be identified by the short-hand designation $P^1$, and those planetary gear subsets using the larger diameter planet mounting shafts 156' shall be identified by the short-hand designation $P^2$.

Figure 5A:
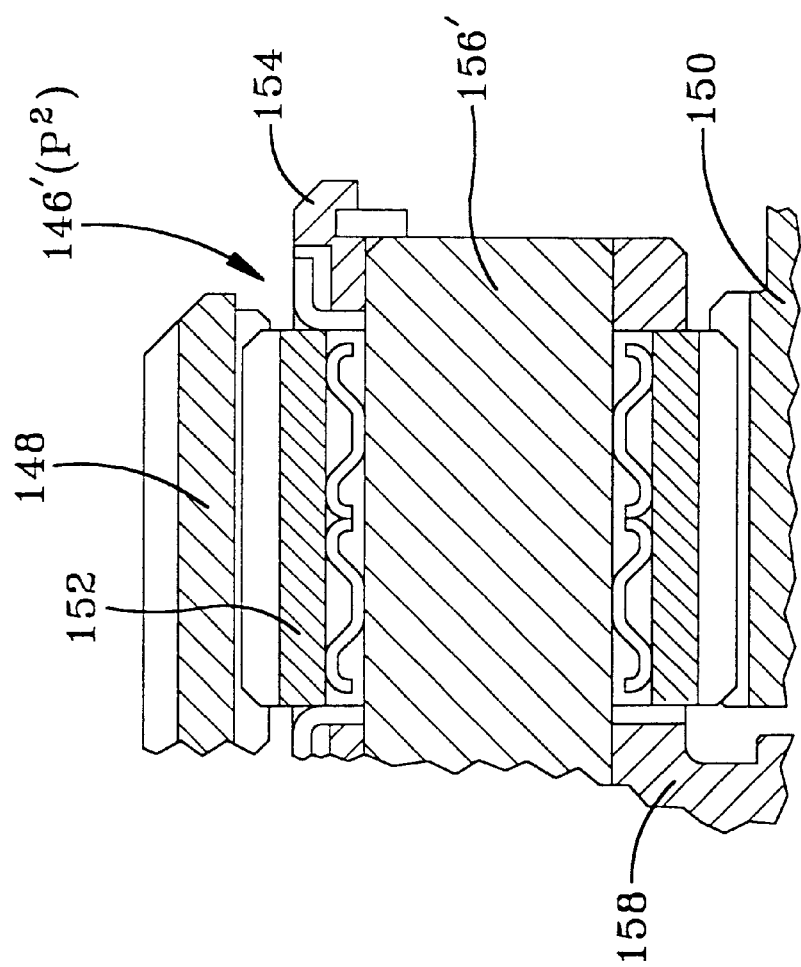
FIG. 5A focuses on a variation incorporated in that portion of FIG. 5 which is delineated by the chain-line rectangle designated as "SEE FIG. 5A" and depicting the specific change that may be made to the planet supporting shafts such as that planetary gear subset represented in FIG. 5 when the anticipated forces applied to the planetary gear subset in certain transmission types exceeds the loads applied in other transmission types.

In some situations the planetary gear mounting shafts in one planetary gear subset may even be almost twice the diameter of other planet gear mounting shafts in planetary gear subsets incorporated in even the same transmission. As such, the planet gear mounting shaft 156' in planetary gear subset 146' (as depicted in FIG. 5A) may well be on the order of approximately twice the diameter of planetary gear mounting shaft 156 in planetary gear subset 146 (as depicted in FIG. 5). The interengaged components such as the outer ring gear 148, the inner sun gear 150, the planet gears 152 and the carrier 154 shall each be sized appropriately with respect to the planet gear supporting shaft 156 or 156' employed. Those components shall not, however, be separately numbered herein.

The planetary gear subset 146 is mounted on a central shaft 32 by virtue of the mechanical interface 38 that may be identical to the interface employed to secure the linking member 34 to the central shaft 32 as described in conjunction with FIGS. 1 and 2. That is, as is best seen in FIG. 5, splines 46 may be presented from the radially inner extent 158 of the carrier 154, and those splines 46 engage the axial grooves 48 to effect a mechanical interface, indicated generally at 38, between the central shaft 32 and the planetary gear subset 146. The transverse ends 54 of the splines 46 matingly engage the opposed transverse ends 56 of the grooves 48 to delineate the extent to which the central shaft 32 can be axially displaced in at least one direction relative to the planetary gear subset 146—viz.: to the right as viewed in FIG. 4. The central shaft 32 can, however, be axially displaced freely to the left as viewed in that figure.

Other than the aforesaid differences in the central shaft sub-assemblies, the second housing assembly 142 may utilize the same housing sub-assembly 130 as housing assembly 10. That is, the housing sub-assembly 130 in housing assembly 142 employs a hollow, tube-like annular casing 12 with a generally cylindrical inner surface 14 that terminates in first and second open ends 16 and 18, respectively, that are, in turn, circumscribed by rims 20 and 22, respectively. Each rim 20 and 22 presents a plurality of circumferentially spaced, preferably threaded, bores 24 utilized when securing input and output assemblies to the housing assembly, as will be more fully hereinafter described.

The housing sub-assembly 130 also includes a transverse partition 26 that is secured within the medial portion of the annular casing 12 in such a manner as to preclude rotational movement and/or axial displacement of the partition 26 relative to the casing 12 once the partition 26 is secured therein. Here, too, the specific manner by which the partition 26 is secured is not critical.

With the partition 26 in place, one may conveniently secure shroud 44A to the partition 26, as by bolts 66A. Thereafter, it is convenient to secure the motor/generator 82 within the casing 12, as by securing the stator 86 to the generally cylindrical inner surface 14 of the casing 12.

With continued reference to FIGS. 4 and 5, it can be observed that as the central shaft sub-assembly 144 is fully inserted within the housing sub-assembly 130 through the second open end 18 of casing 12, a splined interface 160 effects a driving connection between the radially outer surface 162 on the annular collar 164 of flanged hub plate 166 and the radially inner surface 168 of the connecting hub 104 on support ring 96, as best seen in FIG. 5. Inasmuch as the teeth 170 on the radially outer terminus 172 of hub plate 166 matingly engage the teeth 174 on the ring gear 148 of planetary gear subset 146, the hub plate 166 thereby effects a driving connection between the rotor 92 of motor/generator 86 and the ring gear 148 of the planetary gear subset 146.

To facilitate, and stabilize, rotation of the hub plate 166, a thrust bearing 176 is preferably interposed between the hub plate 166 and the terminal flange 70A on shroud 44A. A second thrust bearing 178 may be similarly interposed between the flared hub plate 166 and the radially inner extent 158 of carrier 154. Another thrust bearing 180 is interposed between the sun gear 150 and the inner extent 158 of carrier 154.

With the central shaft sub-assembly 144 positioned adjacent shroud 44A and with the driving interconnections having been established relative to the rotor 92 of motor/generator 82 and the outer ring gear 148 of planetary gear subset 146 as well as between the carrier 154 of planetary gear subset 146 and the shaft 32 of central shaft subassembly 144, the shroud 44B can be secured to the partition 26 by bolts 66B. Thereafter, it is generally convenient to secure motor/generator 84 within casing 12, as by securing the stator 88 to the generally cylindrical inner surface 14 of casing 12. So positioning the motor/generator 84 not only establishes the bearing assembly 72B operatively between the terminal portion 70B of shroud 44B and the connecting hub 106 of support ring 98 but also operatively connects the radially outer, annular face 182 of the axially extending collar portion 184 on the sun gear 150 in planetary gear subset 146 to the radially inner surface 186 of the connecting hub 106, as by a splined interface 188.

As such, all three components of the planetary gear subset 146 are operatively connected to the second housing assembly 142—viz.: the ring gear 148 and the sun gear 150 are connected to the housing sub-assembly 130 (through motor/generators 82 and 84, respectively) and the carrier 154 is connected to the central shaft sub-assembly 144 through shaft 32.

Two Forms of a Modular Input Assembly

Figure 6:
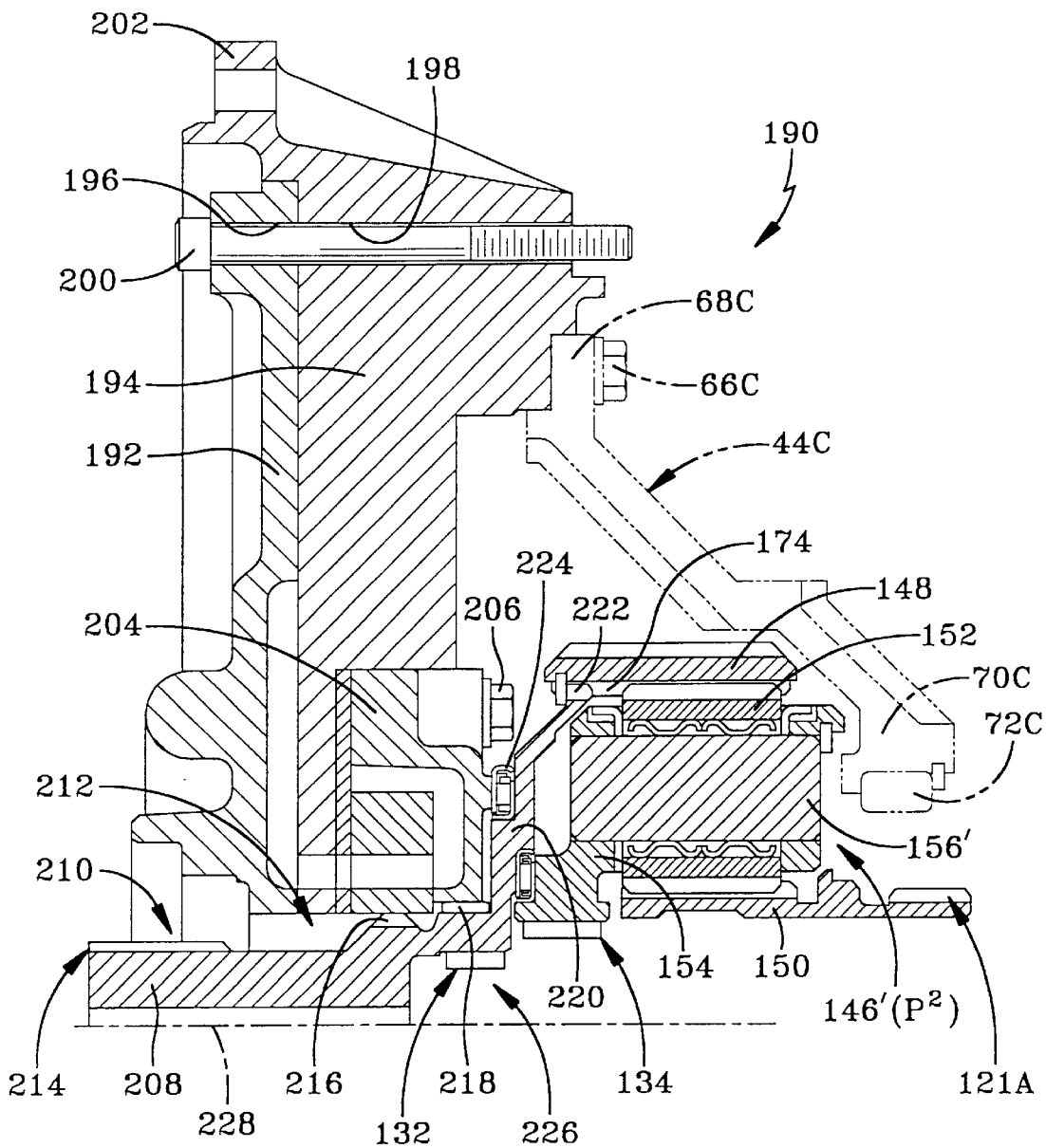
FIG. 6 is a longitudinal cross section of one form of an input assembly particularly adapted for use in the assembly of not only a simple, "series" generator-motor transmission that does not employ a mechanical connection between the input and output shaft members but also a single-mode, input-split transmission as well as a single-mode, compound-split transmission (a modest variation of said input assembly being adapted for use in a dual-mode, compound-split transmission), said cross section being taken along a plane that extends radially outwardly from the centerline of that input assembly.

FIG. 6 depicts one form of an input assembly designated generally by the numeral 190. An end cap 192 is axially juxtaposed to a conventional valve body/pump housing 194 for distributing lubricating and control oil to the transmission in which the input assembly 190 is to be incorporated.

A plurality of circumferentially spaced bores 196 and 198 penetrate the respective end cap 192 and housing 194 to align with each other and, in turn, to align with threaded bores 24 that are circumferentially spaced within the rim 20 that circumscribes the first open end 16 of casing 12 to receive the bolts 200 by which the input assembly 190 may be secured to a housing assembly 10 or 142.

A plurality of mounting ears 202 may extend radially outwardly from the valve body/pump housing 194 to permit the completed transmission to be secured to the adjacent power train member such as a transient torque damper, a clutch housing or even an internal combustion engine (none of which is shown) in the mechanical power train that drives the transmission.

A conventional internal/external gear pump 204 may be secured to the valve body/pump housing 194, as by bolts 206.

An input shaft member 208 is positioned to extend axially through the aligned central apertures 210 and 212 that respectively penetrate the axially adjacent end cap 192 and valve body/pump housing 194. A mechanical interface 214 is provided on the outer circumference of input shaft member 208 by which to effect a torque transfer from the next preceding element (not shown) in the mechanical power train that provides the input torque to the transmission.

A plurality of gear teeth 216 may be provided on the exterior of the input shaft member 208 to drive the conventional gear pump 204. Inboard of the gear teeth 216 the input shaft member 208 may present an annular bearing interface 218 to facilitate rotation of the input shaft member 208 relative to the fixedly positioned gear pump 204.

A bell portion 220 presented from the input shaft member 208 extends radially outwardly from the bearing interface 218 to terminate in gear teeth 222 that mesh with the teeth 174 on the outer ring gear 148 of a planetary gear subset 146' ($P^2$). The axial disposition of the bell portion 220, and its ability to rotate with input shaft member 208, is assured by interposing a thrust bearing 224 between the bell portion 220 and the exterior of the gear pump 204. Because the planetary gear subset 146' is of the type generally designated as style $P^2$, the planetary gear supporting shafts are each of the larger diameter and are, therefore, designated as mounting shafts 156'.

A pilot bore 226 is disposed along the longitudinal axis 228 of the input shaft member 208, and thus radially inwardly the bell portion 220. The pilot bore 226 is provided to receive the pilot extension 140A on central shaft 32 when the input assembly 190 is secured to the housing sub-assembly 130. As such, the longitudinal axis 228 of the input shaft member 208 will thus become concomitant with the longitudinal axis, heretofore unnumbered, of the central control shaft 32.

The mounting flange 68C on conically flared shroud 44C may be secured to valve body/pump housing 194 by a plurality of bolts 66C. The shroud 44C tapers axially away from valve body/pump housing 194 to terminate in a radially inner terminal flange 70C, which contributes to the location and support of a bearing means 72C that is more thoroughly hereinafter described in conjunction with the mounting of the input assembly 190 on either housing assembly 10 or 142.

In passing, it should be noted that the input assembly 190 may also offer a dual pump option. That is, one may employ a second gear pump (not shown) that may be mounted on the opposite side, or longitudinal exterior, of the valve body/pump housing 194 relative to the gear pump 204 depicted in FIG. 6. A gear pump so located may be driven directly by the output shaft (not shown) of an internal combustion engine (also not shown). Inasmuch as the present invention is directed to modularly constructed transmissions there appears to be no need to depict, or describe, such a second gear pump that is, in fact, only required if a disconnect clutch is added between the engine and the input connection 214.

There are only two variations of the input assembly—viz.: that assembly which incorporates a style $P^1$ planetary gear subset (hence planetary gear subset 146) or that which incorporates style $P^2$ of the planetary gear subset (hence planetary gear subset 146'). There are, however, several variations of the hereinafter described output assemblies, and, as should now be apparent, those output assemblies incorporating planetary gear subsets wherein the relative diameters of the planet gear mounting shafts are of the relatively smaller diameter shall be designated as being of style $P^1$ whereas planetary gear subsets employing the relatively large diameter planet gear mounting shaft shall be designated as being of style $P^2$.

One Form of a Modular Output Assembly

Figure 7:
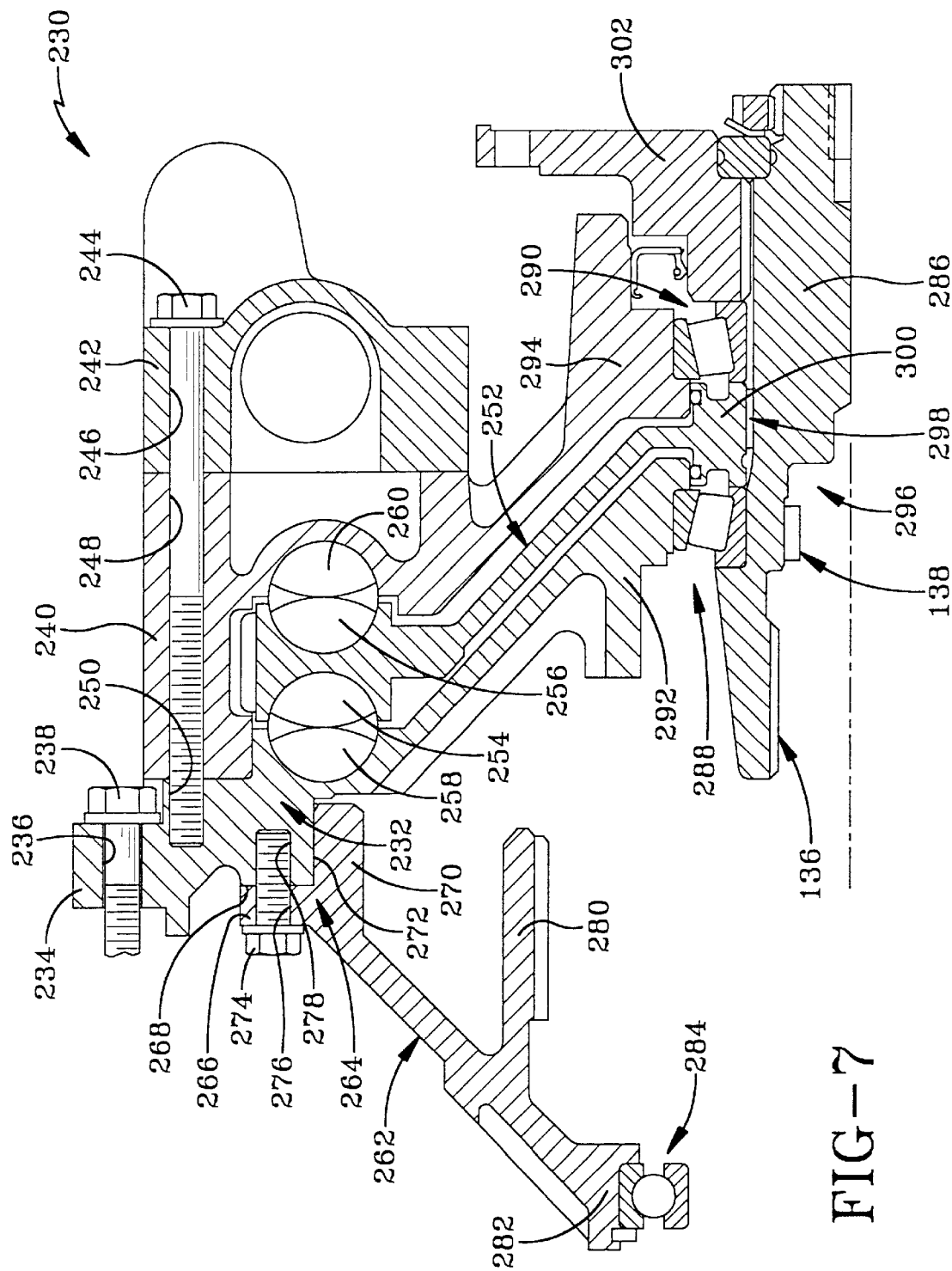
FIG. 7 is a longitudinal cross section of one form of an output assembly particularly adapted for use in the assembly of a single-mode, compound-split transmission, said cross section being taken along a plane that extends radially outwardly from the centerline of that output assembly.

With particular reference to FIG. 7, one form of a modular output assembly is designated generally at 230. The output assembly 230 has a conically flared main frame 232 that extends axially rearwardly and radially inwardly from a radially extending connecting rim 234. A plurality of circumferentially spaced bores 236 penetrate the connecting rim 234. The bores 236 are aligned with the threaded bores 24 that are circumferentially spaced within the rim 22 that circumscribes the second open end 18 of casing 12 to receive bolts 238 by which the outputs assembly 230 may be secured to housing assembly 10 or 142.

A rear frame 240 and a conventional, annular retarder valving sub-housing 242 may be supported from the main frame 232 by bolts 244 that penetrate circumferentially spaced bores 246 in the retarder valve sub-housing 242, which bores 246 align not only with circumferentially spaced bores 248 in the rear frame 240 but also with threaded bores 250 in the main frame 232, all to receive the anchor bolts 244.

A rotatable retarder member 252 is operatively disposed between the main and rear frames 232 and 240, respectively, to permit the desired interaction between the rotating retarder blades 254 and 256 on the retarder member 252 and the fixed retarder blades 258 and 260 on the main and rear frames 232 and 240, respectively.

A conically flared shroud 262 is secured to the inboard side of the main frame 232. To assure both axial and radial stability for the shroud 262 the mounting flange 264 is preferably comprised of not only a radially extending axial stabilizer 266 that engages a radially oriented face 268 on the main frame 232 but also an annularly extending, radial stabilizer 270 that engages an annular face 272 on the main frame 232. A plurality of mounting bolts 274 penetrate a plurality of circumferentially spaced bores 276 in the axial stabilizer 266 to be received in an aligned plurality of threaded bores 278 in radially oriented face 268 on main frame 232.

An annular flange 280 may extend axially rearwardly from the shroud 262 to accommodate usage of a common shroud 262 in the present output assembly as well as the hereinafter described output assembly depicted in FIG. 8. That is, the annular flange 280 has no functional purpose in the present output assembly 230 but does in the output assembly depicted in FIG. 8, as will be hereinafter more fully explained.

The conically flared shroud 262 tapers axially away from the main frame 232 as the shroud 262 extends radially inwardly from its mounting flange 264 to the terminal flange 282. A bearing means 284 is located at the radially inner extent of the terminal flange 282. The purpose of the bearing means 284 is hereinafter more fully described in conjunction with the discussion as to the attachment of the output assembly 230 to housing assembly 10 or 142.

An output shaft 286 is rotatably received in bearing means 288 and 290 presented from the radially inner extremities 292 and 294 of the main and rear frame members 232 and 240, respectively.

A pilot bore 296 is presented at the inboard portion of the output shaft 286 to receive pilot extension 140B on central shaft 32 when the output assembly 230 is operatively secured to the casing 12 of housing assembly 142.

The interface 136 between central shaft 32 and output shaft 286 may be of the splined variety in order to effect a driving connection between the output shaft 286 and the central shaft 32 when a transmission embodying the output assembly 230 is assembled, as will be hereinafter more fully described. A similar splined interface 298 is preferably interposed between the radially inner extremity 300 of the rotatable retarder member 252 and the output shaft 286.

A drive hub 302 may, as is well known to the art, be secured to the output shaft 286 to be rotatable therewith.

Another Form of a Modular Output Assembly

Figure 8:
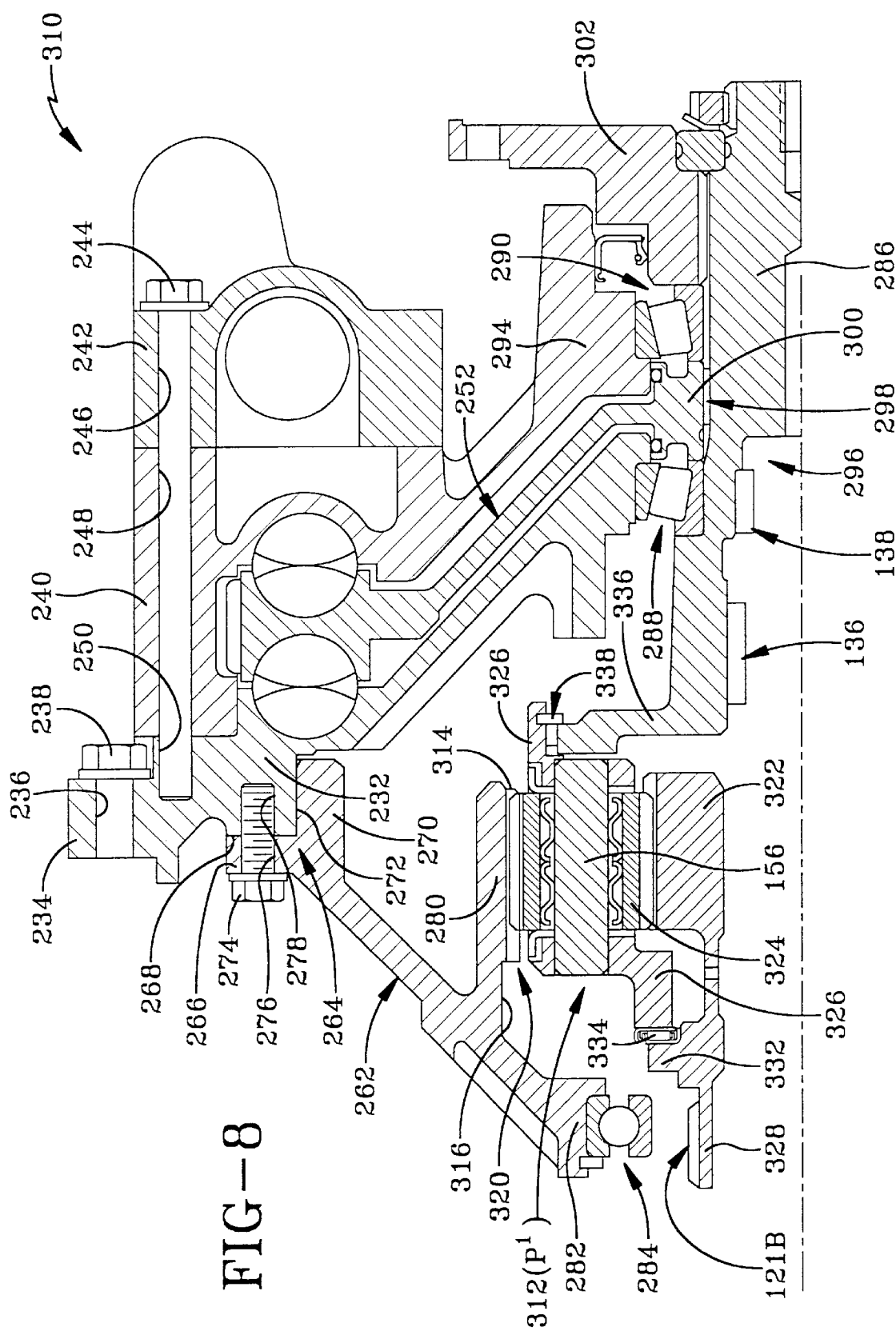
FIG. 8 is a longitudinal cross section of another form of an output assembly particularly adapted for use in the assembly of a simple, series generator-motor transmission as well as a single-mode, input-split transmission, said cross section being taken along a plane that extends radially outwardly from the centerline of that output assembly.

With particular reference to FIG. 8, a second output assembly is designated as 310. In fact, the second output assembly 310 comprises a relatively minor modification to the basic output assembly 230 with the aforesaid modification being utilized to effect an interaction with a planetary gear subset 312 in the style of $P^1$.

As noted in the description of the output assembly depicted in FIG. 7, a common shroud 262 is utilized in the present output assembly 310, as well. Hence, the conically flared shroud 262 is secured to the inboard side of the main frame 232, and to assure both axial and radial stability for the shroud 262 the mounting flange 264 is preferably comprised of not only a radially extending axial stabilizer 266 that engages a radially oriented face 268 on the main frame 232 but also an annular, or radial, stabilizer 270 that engages an annular face 272 on the main frame 232. A plurality of mounting bolts 274 penetrate a plurality of circumferentially spaced bores 276 in the axial stabilizer 266 to be received in an aligned plurality of threaded bores 278 in radially oriented face 268 on main frame 232.

The annular flange 280 extends axially rearwardly from the fixed shroud 262, and the teeth 314 on the radially inner surface 316 of flange 280 serve as a grounded ring gear 320 of planetary gear subset 312 (style $P^1$). The grounded ring gear 320 circumscribes a sun gear 322, and a plurality of planet gears 324 rotatably mounted on a carrier 326 simultaneously, and meshingly, engage both the outer, ring gear 320 and the inner sun gear 322. Because planetary gear subset 312 is of style $P^1$, the planet mounting shafts are designated as 156.

An annular collar 328 extends forwardly from the sun gear 322 to present an interface 121B that operatively connects the sun gear 322 to the rotor 94 of motor/generator 84 within the housing assembly 10 when the output assembly 310 is secured thereto, as will be hereinafter more fully described.

A spur 332 extends radially outwardly from the collar 328, and a thrust bearing 334 may be interposed between the spur 322 and the carrier 326 to facilitate relative rotation between the sun gear 322 and the carrier 326.

A connecting flange 336 extends radially outwardly from the output shaft 286 and is keyed, as at 338, to assure that the carrier 326 and the output shaft 286 will rotate in unison.

A Third Modular Output Assembly

Figure 9:
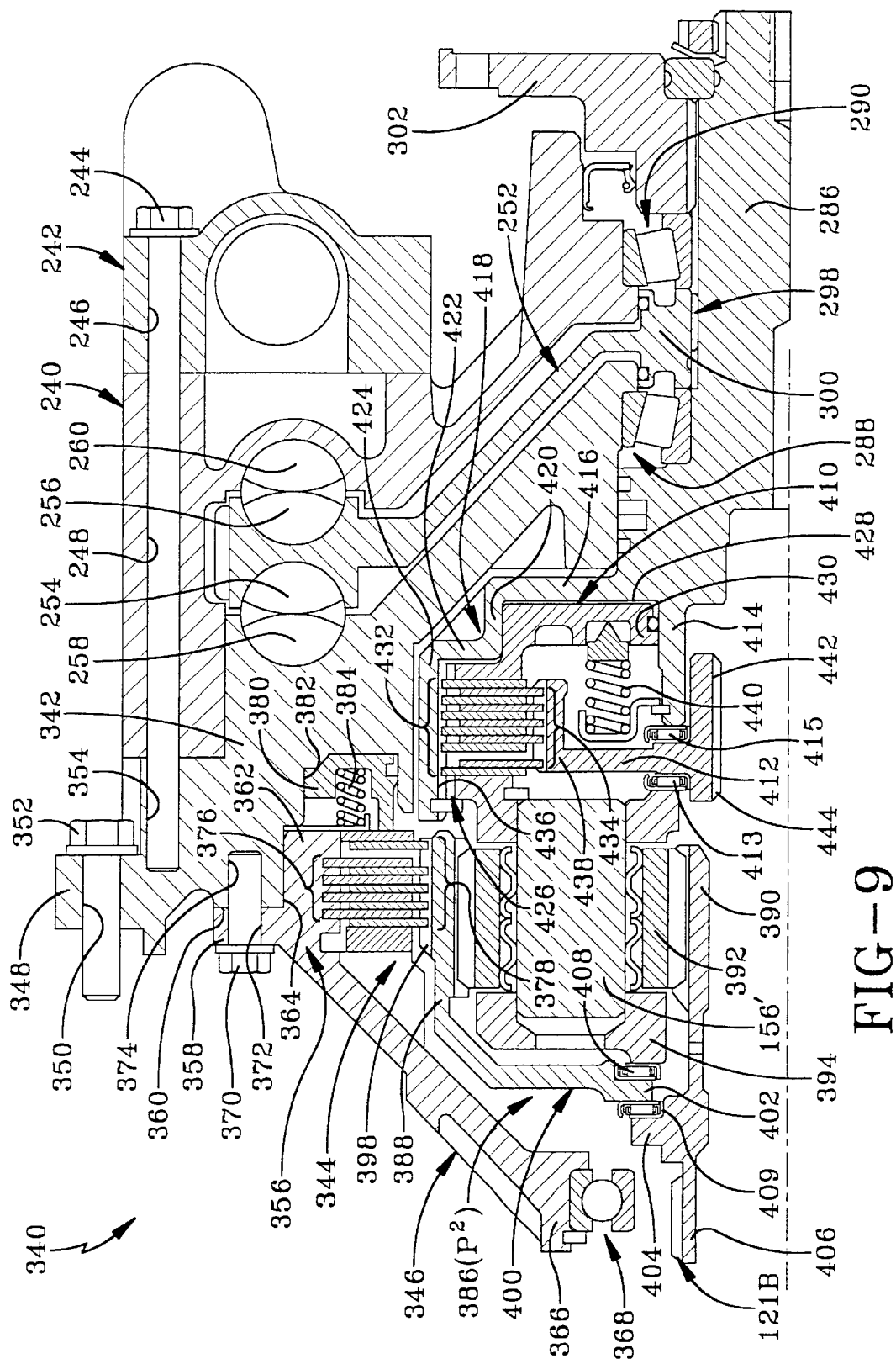
FIG. 9 is a longitudinal cross section of yet another form of an output assembly particularly adapted for use in the assembly of a dual-mode, compound-split transmission, said cross section being taken along a plane that extends radially outwardly from the centerline of that output assembly.

With particular reference to FIG. 9, a third output assembly is designated as 340. The output assembly 340 includes an annularly flared main frame 342, but it should be understood that the main frame 342 is preferably more substantial than the main frames 232 utilized in output assemblies 230 (FIG. 7) and 310 (FIG. 8) inasmuch as the main frame 342 must not only support but also provide the reactive grounding resistance to forces applied to a clutch in the nature of a torque transfer device 344. In addition, the main frame 342 supports a conically flared shroud 346. Each of the aforesaid structural components will be hereinafter more fully described.

Except for the more massive structure of main frame 342, the main frame 342, like the main frames 232 in output assemblies 230 and 310, extends axially rearwardly and radially inwardly from a radially extending connecting rim 348. A plurality of circumferentially spaced bores 350 penetrate the connecting rim 348. The bores 350 align with the threaded bores 24 that are circumferentially spaced within the rim 20 that circumscribes the second open end 18 of casing 12 to receive bolts 352 by which the output assembly 340 may be secured to housing assembly 142.

As with output assemblies 230 and 310, a rear frame 240 and a conventional, annular retarder valving sub-housing 242 may be supported from the main frame 342 by bolts 244 that penetrate circumferentially spaced bores 246 in the retarder valve sub-housing 242, which bores 246 align not only with circumferentially spaced bores 248 in the rear frame 240 but also with threaded bores 354 in the main frame 342, all to receive the anchor bolts 244.

Also as in output assemblies 230 and 310, a rotatable retarder member 252 is operatively disposed between the main and rear frames 342 and 240, respectively, to permit the desired interaction between the rotating retarder blades 254 and 256 on the retarder member 252 and the fixed retarder blades 258 and 260 on the main and rear frames 342 and 240, respectively.

The conically flared shroud 346 is secured to the inboard side of the main frame 342. To assure both axial and radial stability for the shroud 346 the mounting flange 356 on shroud 346 is preferably comprised of not only a radially extending axial stabilizer 358 that engages a radially oriented face 360 on the main frame 342 but also an annularly extending, radial stabilizer 362 that engages an annular face 364 on the main frame 342.

The annularly extending, radial stabilizer 362 is comparable to the stabilizer 270 on shroud 262, but stabilizer 362, too, is preferably more massive than stabilizer 270 in order to provide a suitably fixed platform by which to ground the hereinafter described clutch 344.

The conically flared shroud 346 tapers axially away from the main frame 342 as the shroud 346 extends radially inwardly from its mounting flange 356 to the terminal flange 366. A bearing means 368 is located at the radially inner extent of the terminal flange 366. The purpose of the bearing means 368 is hereinafter more fully described in conjunction with the discussion as to the attachment of the output assembly 340 to housing assembly 142.

A plurality of mounting bolts 370 penetrate a plurality of circumferentially spaced bores 372 in the axial stabilizer 358 to be received in an aligned plurality of threaded bores 374 in radially oriented face 360 on the mounting flange 356 of shroud 346.

Returning to the clutch 344 which, in reality, is a well known torque transfer device that employs two groups—viz. 376 and 378—of interleaved, friction clutch disks. Group 376 of alternate disks are secured to the annularly extending, radial stabilizer 362 which serves as a ground that precludes rotation of the disks in group 376. Group 378 of the alternate, interleaved, friction disks are secured to the rotatable member that is to be selectively grounded. An operating piston 380 is received within a cylinder 382 such that pressurized fluid fed into the cylinder 382 drives the piston 380 to force the two groups 376 and 378 of friction disks into contiguous engagement and thereby effect grounding. Upon depressurization of the cylinder 382, a spring 384 biases the piston 380 to effect disengagement of the two groups 376 and 378 of friction disks.

The torque transfer device 344 operatively engages a rotating member in a planetary gear subset 386 (style $P^2$). This planetary gear subset 386 has an outer gear member 388 that is generally designated as the ring gear, and the ring gear 388 circumscribes an inner gear member 390 that is generally designated as the sun gear. A plurality of planet gears 392 are rotatably mounted on a carrier 394 such that the planet gears 392 simultaneously, and meshingly, engage both the outer ring gear 388 and the inner sun gear 390 of this planetary gear subset 386. It should be observed that the supporting shaft 396 for each planet gear 392 is preferably of sufficient diameter that marks this planetary gear subset as being a style $P^2$ subset.

The outer ring gear 388 is provided with a splined interface 398 which precludes relative rotation between the ring gear 388 and the second group 378 of alternate friction disks in the torque transfer device 344. When the torque transfer device 344 is not activated, the ring gear 388 is free to rotate, and that ability to rotate is enhanced by a stabilizing disk 400, the central hub 402 of which is disposed between the carrier 394 and a spur 404 that extends radially outwardly from an annular collar 406 that extends axially forwardly from the sun gear 390. The collar 406 presents a driving interface 121B that is operatively engageable with a motor/generator, as will be hereinafter more fully explained, when the output assembly 340 is mounted on a housing assembly 142.

It should also be noted that a thrust bearing 408 may be interposed between the central hub 402 of stabilizing disk 400 and the carrier 394. A similar thrust bearing 409 may be interposed between the central hub 402 and the spur 404. These two thrust bearings enhance rotation of the stabilizing disk 400.

A splined interface 298 is interposed between the radially inner extremity 300 of the rotatable retarder member 252 and the output shaft 286. A drive hub 302 may be secured to the output shaft 286, as is also the situation with the output assemblies 230 and 310.

The output assembly 340 also employs a second clutch in the nature of a torque transfer device 410 the effects a selective connection between the output shaft 286 and a transfer member in the nature of a connecting wheel 412 that is rotatably connected, when the transmission is assembled, to the central control shaft 32.

The output shaft 286 presents an axially oriented collar 414 and a radially extending plate 416. A thrust bearing 413 may be disposed between the connecting wheel 412 and the carrier 394, and a similar thrust bearing 415 may be interposed between the connecting wheel 412 and the collar 414 on the output shaft 286. These two thrust bearings enhance rotation of the connecting wheel 412.

The plate 416 merges with an offset connector 418 that is comprised of an axially oriented portion 420 and a radially oriented portion 422 that, in turn, joins an annular terminus 424. The annular terminus 424 is permanently connected to the carrier 294, as at 426. The collar 414, the radial plate 416, both portions 420 and 422 of the offset connector 418 and the terminus 424 define the perimeter of a chamber 428 within which a piston 430 is axially displaceable in response to fluid pressure introduced within the chamber 428, as is well known to the art.

The second clutch 410 also employs two groups 432 and 434 of alternate, interleaved friction disks. Each disk in group 432 of the alternate, interleaved friction disks are secured to the annular interior 436 of the terminus 424 so that relative rotation between the group 432 and the terminus 424 is not permitted. Each disk in the second group 434 is similarly secured to the outer rim 438 of the connecting wheel 412 so that relative rotation between the group 434 and connecting wheel 412 is not permitted.

Hence, when pressurized fluid is introduced into the chamber 428, the piston 430 is driven to effect engagement of the two groups 432 and 434 of alternate, interleaved, friction disks such that the two groups can only rotate in unison. Upon depressurization of the chamber 428, a spring 440 biases the piston 430 to effect disengagement of the two groups 432 and 434 of friction disks.

The radial interior 442 of the connecting wheel 412 is provided with a driving interface 444 to achieve the desired driving engagement between the connecting wheel 412 and the central shaft 32 when the output assembly 340 is connected to the housing assembly 142, as will be hereinafter more fully described.

Assembling a Single-Mode, Input-Split Transmission

Figure 10:
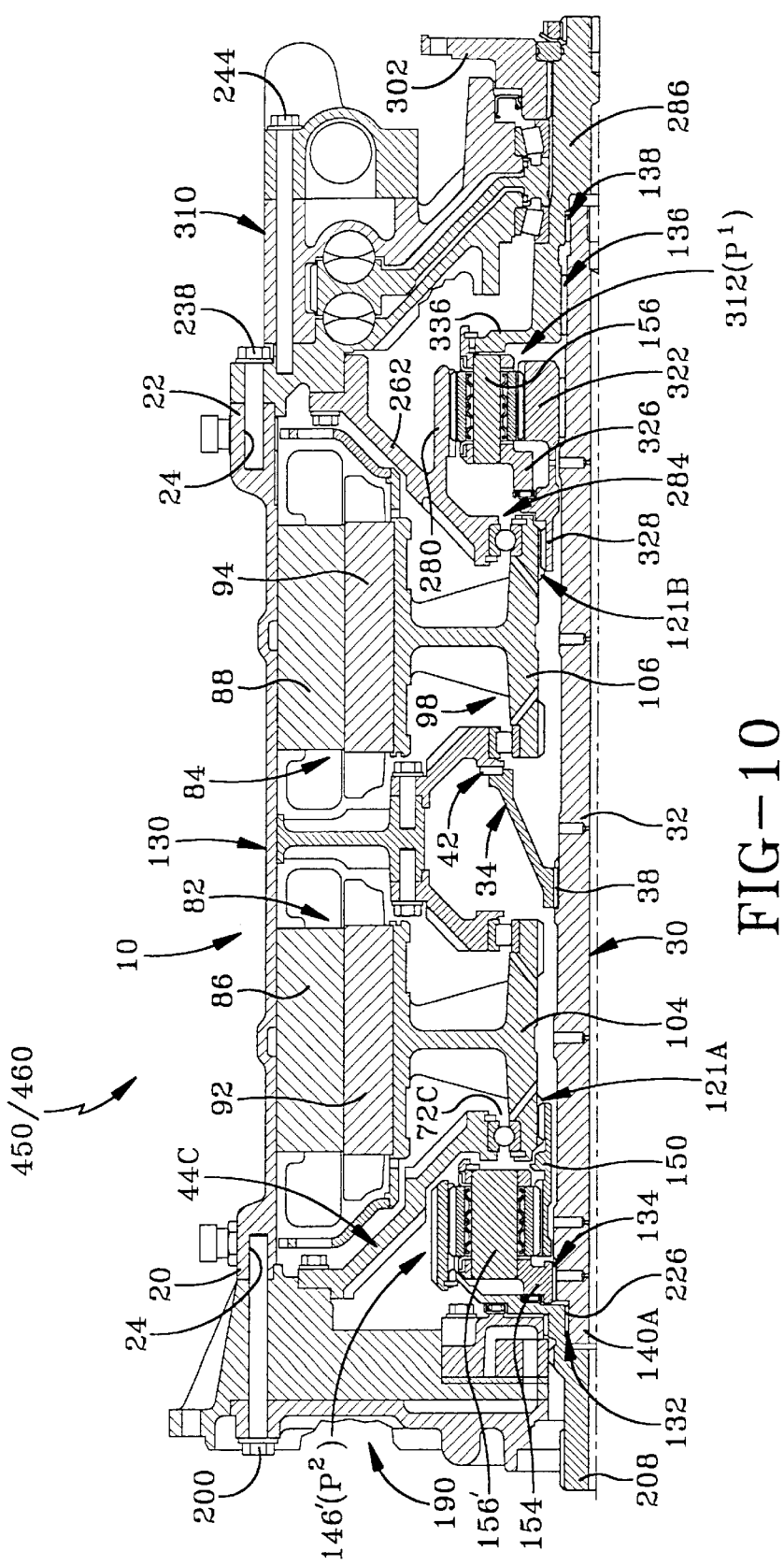
FIG. 10 is a longitudinal cross section of a simple, series generator-motor transmission as well as a single-mode, input-split transmission, either of which is readily assembled, in conformity with the concepts of the present invention, with the first form of a housing assembly depicted in FIG. 1, the central shaft sub-assembly depicted in FIG. 3A or 3B, the input assembly depicted in FIG. 6 and the output assembly depicted in FIG. 8, said cross section being taken along a plane that extends radially outwardly from the centerline of that transmission.
Figure 11:
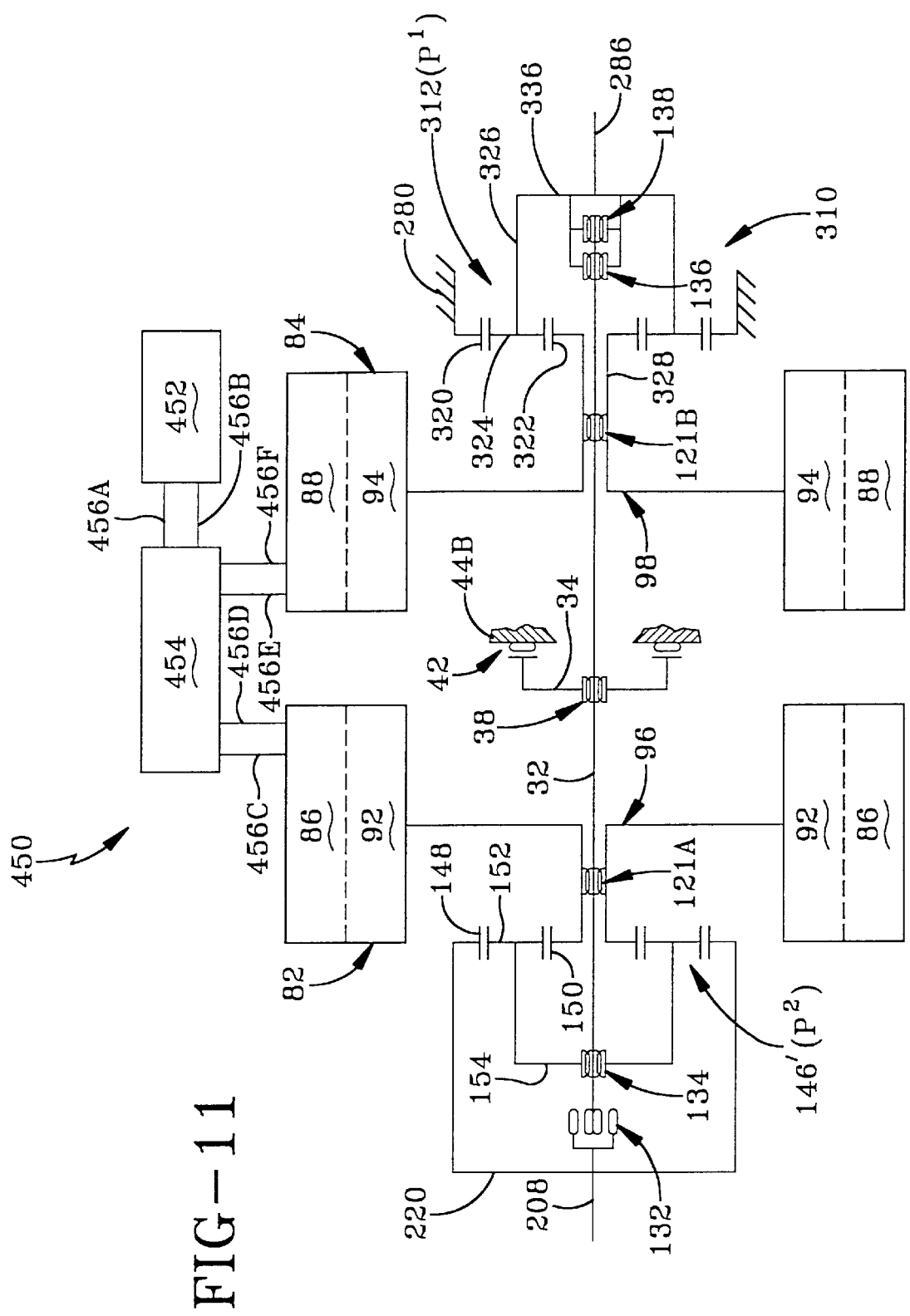
FIG. 11 is a schematic representation of the single-mode, input-split version of the transmission diagrammatically depicted in FIG. 10.
Figure 12:
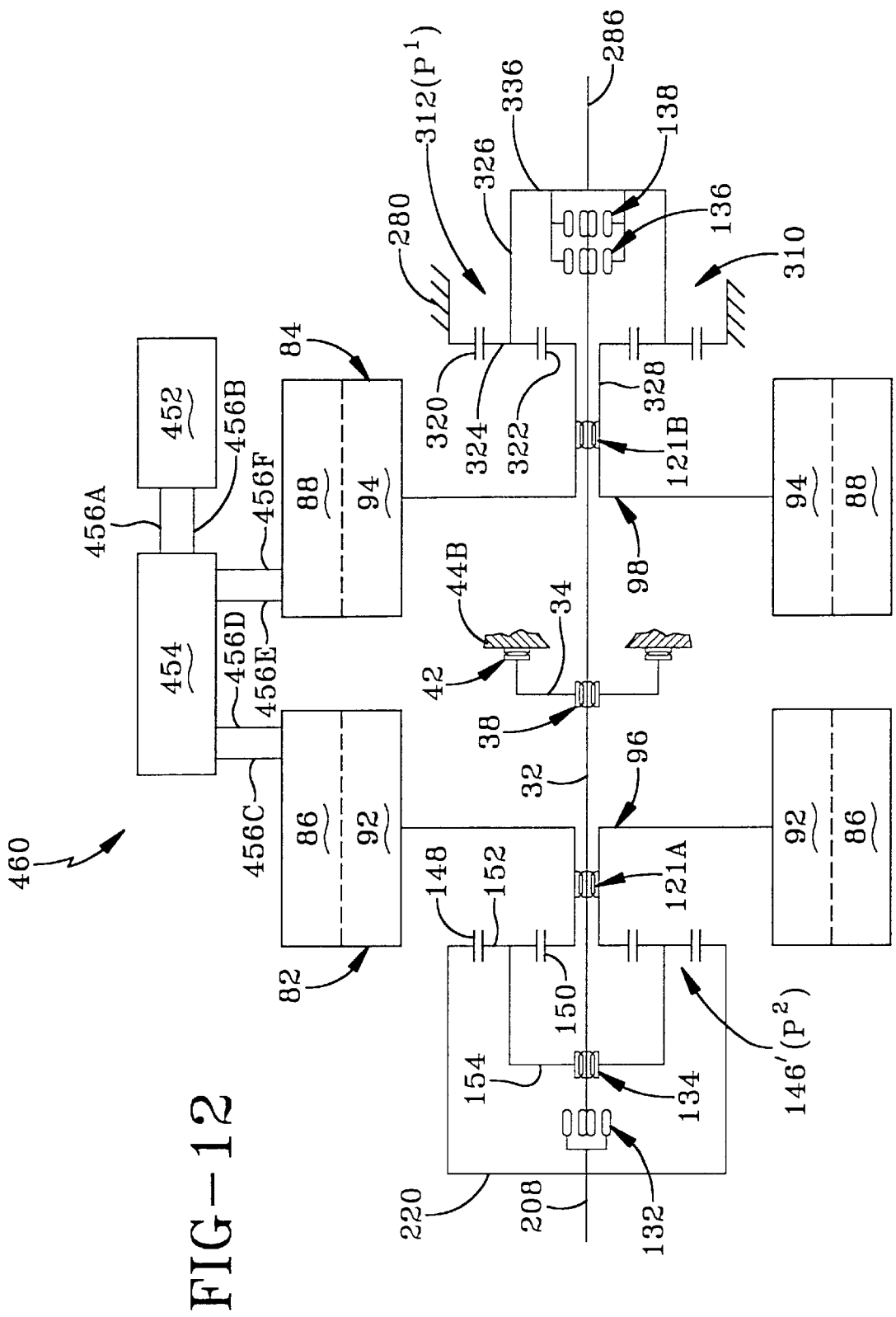
FIG. 12 is a schematic representation of the simple series generator-motor transmission diagrammatically depicted in FIG. 10.

With reference to FIG. 10, the transmission depicted therein is, depending primarily upon the specific radial interface 42 selected, either a single-mode, input-split transmission 450 (if the radial interface 42 is a bearing, as in FIG. 11) or a simple, series generator-motor transmission 460 (if the radial interface 42 effects rotational grounding, as in FIG. 12). As such, FIG. 10 must be considered in close conjunction with FIGS. 11 and 12.

In either event, a housing sub-assembly 130 and a central shaft sub-assembly 30 are utilized, but focusing first on the single-mode, input-split transmission 450, the radial interface 42 is a thrust bearing 74 (FIG. 3A) to permit central shaft 32 to rotate.

An input assembly 190 is connected to rim 20 of casing 12 by bolts 200. When the input assembly 190 is inserted in the first open end 16 of casing 12, the shroud 44C positions the bearing 72C operatively to engage the radially outer side of the inner hub 104 on ring 96 that supports the rotor 92 of the motor/generator 82. The mechanical interface 121A located not only on the radially inner side of hub 104 but also on the sun gear 150 of planetary gear subset 146' (style $P^2$) may be in the nature of a spline operatively to engage those members in order to effect mutual rotation of the rotor 92 and the sun gear 150 in planetary gear subset 146.

An output sub-assembly 310 is connected to the rim 22 of casing 12 by bolts 238. When the output sub-assembly 310 is inserted through the second open end 18 of casing 12, the shroud 262 positions the bearing 284 operatively to engage the radially outer side of the support hub 106 on ring 98 that supports the rotor 94 of motor/generator 84. The mechanical interface 121B located not only on the radially inner side of hub 106 but also on the collar 328 that extends axially from the sun gear 322 is also in the nature of a spline and operatively engages those members to effect mutual rotation of the rotor 94 in motor/generator 82 and the sun gear 322 in planetary gear subset 312.

For the single-mode, input-split transmission 450 (FIG. 11): the interface 132 is a bearing to permit relative rotation between the input shaft 208 and the central shaft 32; the interface 134 is a spline connection to effect a driving connection between the carrier 154 of planetary gear subset 146' (style $P^2$) and the central shaft 32; and, mechanical interfaces 136 and 138 are splines to assure that a driving connection is effected between the carrier 326 of planetary gear subset 312 (style $P^1$) and the central shaft 32 as well as the output shaft 286. However, as noted above in the first paragraph relating to the assembly of this type transmission, the radial interface 42 is a bearing.

With continued reference to FIG. 11, the transmission 450 utilizes power from an electric power source 452. The electric power source 452 may be one or more batteries, or any other electric power sources that have the ability to provide, or store, and dispense electric power. The electric power source 452 communicates with an electrical control unit (ECU) 454 by electrical transfer conductors 456A and 456B. The ECU 454 communicates with the first motor/generator 82 by electrical transfer conductors 456C and 456D, and the ECU 454 similarly communicates with the second motor/generator 84 by electrical transfer conductors 456E and 456F.

Operation of a one-mode, input-split, parallel hybrid transmission may not be readily apparent from the description as to its modular assembly. As such, should one desire a more detailed explanation as to the operation of such a transmission one may refer to U.S. Pat. No. 5,558,595 that issued on Sep. 24, 1996, to Messrs. Michael R. Schmidt and Donald Klemen, which patent is assigned to General Motors Corporation.

Assembling a Simple Series Generator-Motor Transmission

With continued reference to FIG. 10, and as previously noted herein, the transmission depicted therein may, depending primarily upon the specific radial interface 42 selected, also operate as a simple, series generator-motor transmission 460 (FIG. 12). As such, FIG. 10 must be considered in close conjunction with FIG. 12.

Focusing now on the simple, series generator-motor transmission 460, the housing sub-assembly 130 and a central shaft sub-assembly 30 are also utilized. However, for a transmission 460 the radial interface 42 constitutes a grounding member, such as the bolts 76 (FIG. 3B) to preclude rotation of the central shaft 32.

Here, too, an input assembly 190 is connected to rim 20 of casing 12 by bolts 200. When the input assembly 190 is inserted in the first open end 16 of casing 12, the shroud 44C positions the bearing 72C operatively to engage the radially outer side of the inner hub 104 on ring 96 that supports the rotor 92 of the motor/generator 82. The mechanical interface 121A located not only on the radially inner side of hub 104 but also on the sun gear 150 of planetary gear subset 146' (style $P^2$) may be in the nature of a spline operatively to engage those members in order to effect mutual rotation of the rotor 92 and the sun gear 150 in planetary gear subset 146' (style $P^2$).

An output sub-assembly 310 is connected to the rim 22 of casing 12 by bolts 244. When the output sub-assembly 310 is inserted through the second open end 18 of casing 12, the shroud 262 positions the bearing 284 operatively to engage the radially outer side of the support hub 106 on ring 98 that supports the rotor 94 of motor/generator 84. The mechanical interface 121B located not only on the radially inner side of hub 106 but also on the collar 328 that extends axially from the sun gear 322 is also in the nature of a spline and operatively engages those members to effect mutual rotation of the rotor 94 in motor/generator 82 and the sun gear 322 in planetary gear subset 312.

For the simple, series generator-motor transmission 460: the interface 132 is a bearing to permit rotation of the input shaft 208 with respect to the grounded central shaft 32; the interface 134 is also a spline connection to assure that the carrier 154 of planetary gear subset 146' (style $P^2$) and the central shaft 32 do not relatively rotate. At this point it should be emphasized that the radial interface 42 in a simple, series generator-motor transmission 460 effects rotational grounding of the central shaft 32 through shroud 44B to the central partition 28. Hence, the carrier 154 in the planetary gear subset 146' utilized in input assembly 190 is fixed against rotation. Mechanical interfaces 136 and 138 are bearings to assure that the output shaft 286 will rotate relative to the central shaft 32.

Inasmuch as there is not a direct connection between the input shaft 208 and the output shaft 286, mechanically to effect rotation of the output shaft 286 in direct response to rotation of the input shaft 208, the transmission 460 utilizes power generated by motor/generator 82 as well as that energy available from an electric power source 452. The electric power source 452 may be one or more batteries, or any other electric power sources that have the ability to provide, or store, and dispense electric power. The electric power source 452 communicates with an electrical control unit (ECU) 454 by electrical transfer conductors 456A and 456B. The ECU 454 communicates with the first motor/generator 82 by electrical transfer conductors 456C and 456D, and the ECU 454 similarly communicates with the second motor/generator 84 by electrical transfer conductors 456E and 456F.

Operation of the subject transmission should be readily apparent from the description as to its modular assembly, but should no further assistance be desired, one may refer to the aforesaid U.S. Pat. No. 5,558,595.

Assembling a Single-Mode, Compound-Split Transmission

Figure 13:
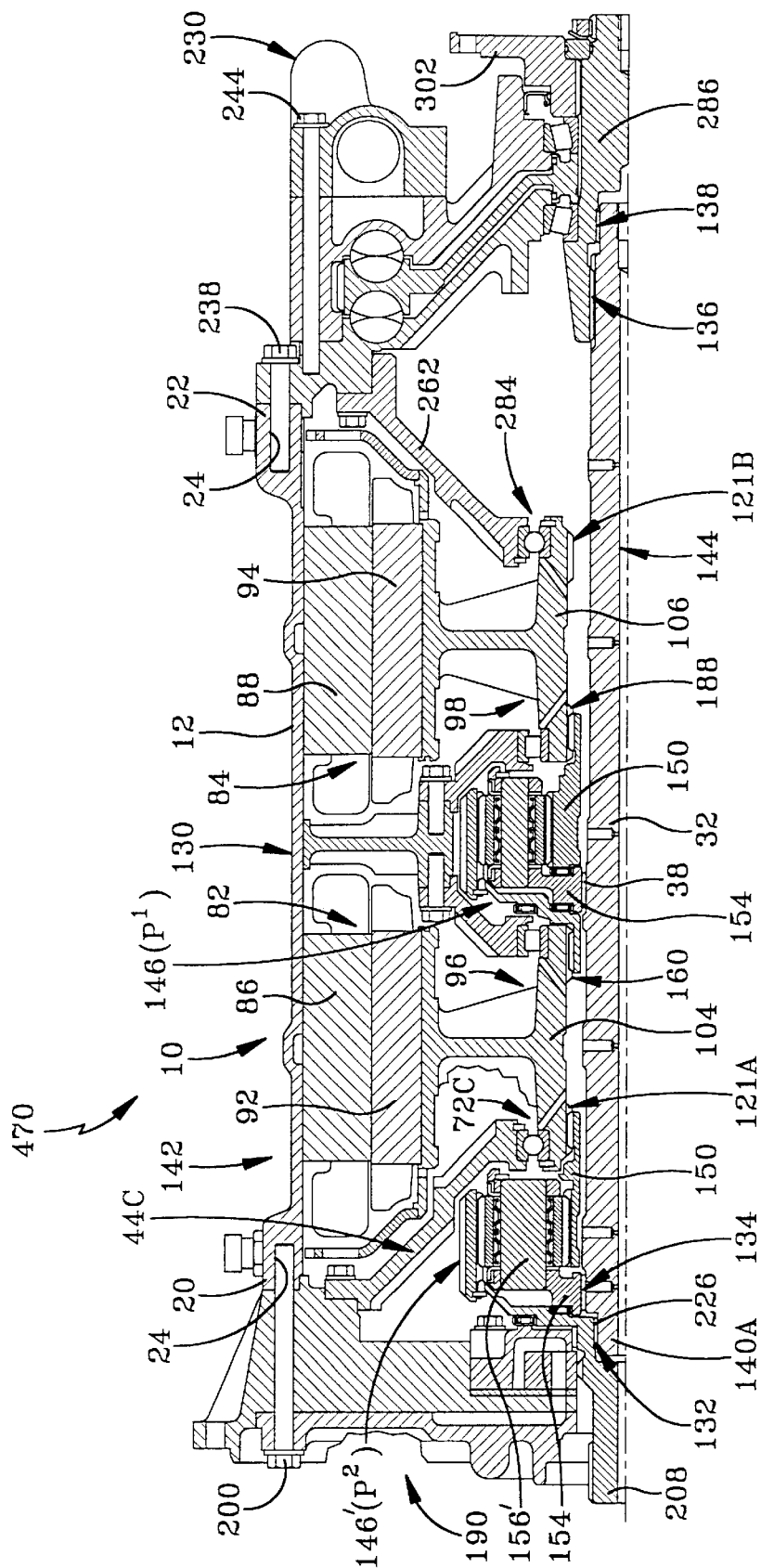
FIG. 13 is a longitudinal cross section of a single-mode, compound-split transmission that is readily assembled, in conformity with the concepts of the present invention, with the second form of a housing assembly depicted in FIG. 4, the input assembly depicted in FIG. 6 and the output assembly depicted in FIG. 7, said cross section being taken along a plane that extends radially outwardly from the centerline of that transmission.
Figure 14:
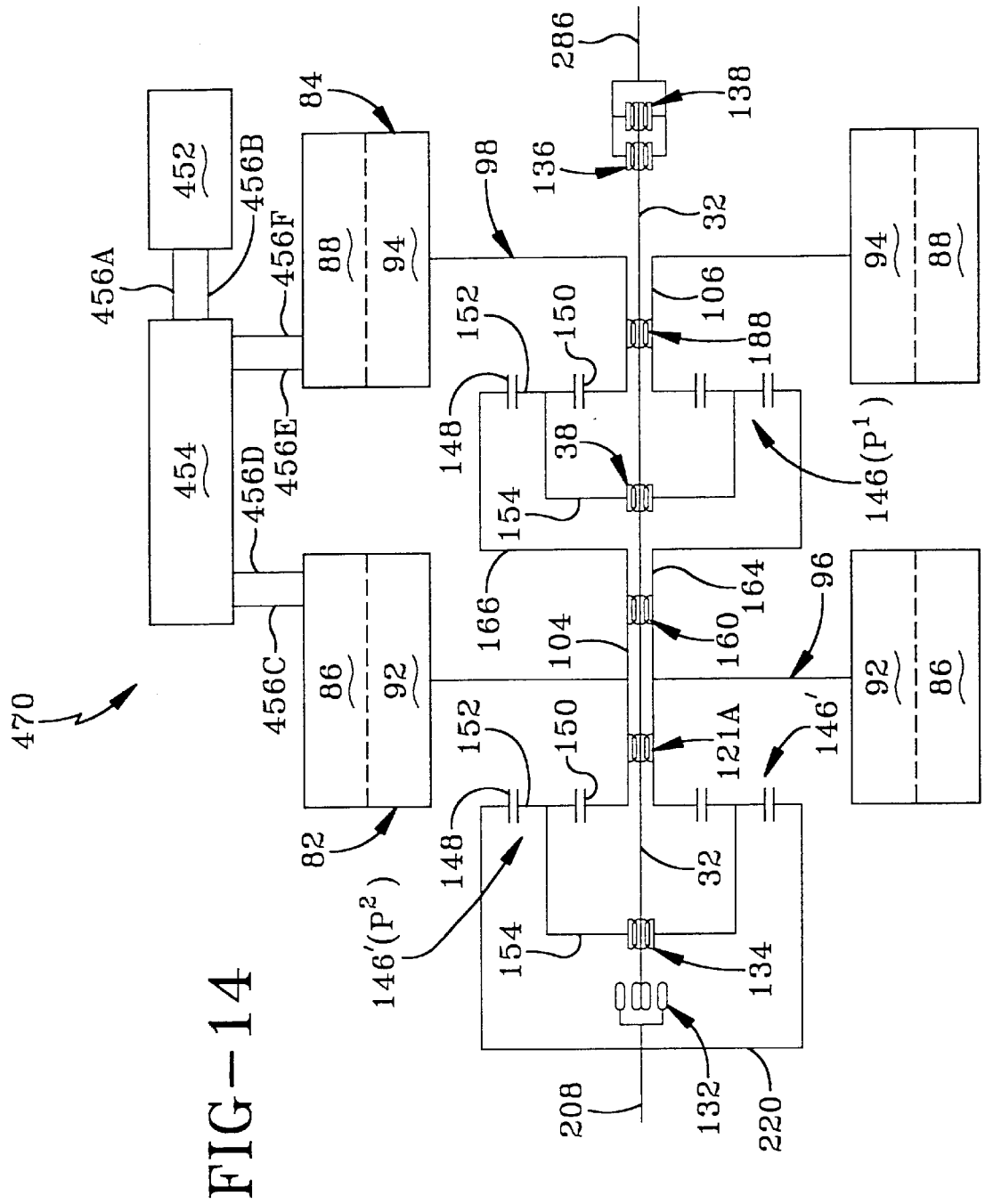
FIG. 14 is a schematic representation of the single-mode, compound-split transmission diagrammatically depicted in FIG. 13.

With reference to FIGS. 13 and 14, a single-mode, compound-split transmission 470 is depicted. The modular assembly of a single-mode compound-split transmission 470 may begin with a housing assembly 142 to which in input assembly 190 and an output assembly 230 are operatively connected.

An input assembly 190 is connected to rim 20 of casing 12 by bolts 200. When the input assembly 190 is inserted in the first open end 16 of casing 12, the shroud 44C positions the bearing 72C operatively to engage the radially outer side of the inner hub 104 on ring 96 that supports the rotor 92 of the motor/generator 82. The mechanical interface 121A located not only on the radially inner side of hub 104 but also on the sun gear 150 of planetary gear subset 146' (style $P^2$) may be in the nature of a spline operatively to engage those members in order to effect mutual rotation of the rotor 92 and the sun gear 150 in planetary gear subset 146'. The interface 132 comprises a bearing to permit the input shaft 208 to rotate relative to the central shaft 32. The interface 134, however, is a spline connection to assure that the carrier 154 in planetary gear subset 146' can only rotate with the central shaft 32.

An output assembly 230 is connected to the rim 22 of casing 12 by bolts 238. When the output sub-assembly 230 is inserted through the second open end 18 of casing 12, the shroud 262 positions the bearing 284 operatively to engage the radially outer side of the hub 106 on ring 98 that supports the rotor 94 of motor/generator 84. The mechanical interface 121B is not employed. The interface 136 and 138 are spline connections to assure that the output shaft 286 rotates in unison with the central shaft 32.

Being a hybrid transmission the transmission 470 may utilize power from an electric power source 452. The electric power source 452 (as depicted in FIG. 14) may be one or more batteries, or any other electric power sources that have the ability to provide, or store, and dispense electric power. The electric power source 452 communicates with an electrical control unit (ECU) 454 by electrical transfer conductors 456A and 456B. The ECU 454 communicates with the first motor/generator 82 by electrical transfer conductors 456C and 456D, and the ECU 454 similarly communicates with the second motor/generator 84 by electrical transfer conductors 456E and 456F.

Operation of the single-mode, compound-split transmission can best be understood as providing continuous operation in the second mode of the hereinafter described dual-mode, compound-split transmission. As such, should one desire a more detailed explanation as to the operation of either such transmission, one may refer to U.S. Pat. No. 5,931,757 that issued on Aug. 3, 1999, to Michael R. Schmidt, which patent is assigned to General Motors Corporation.

Assembling a Dual-Mode, Compound-Split Transmission

Figure 15:
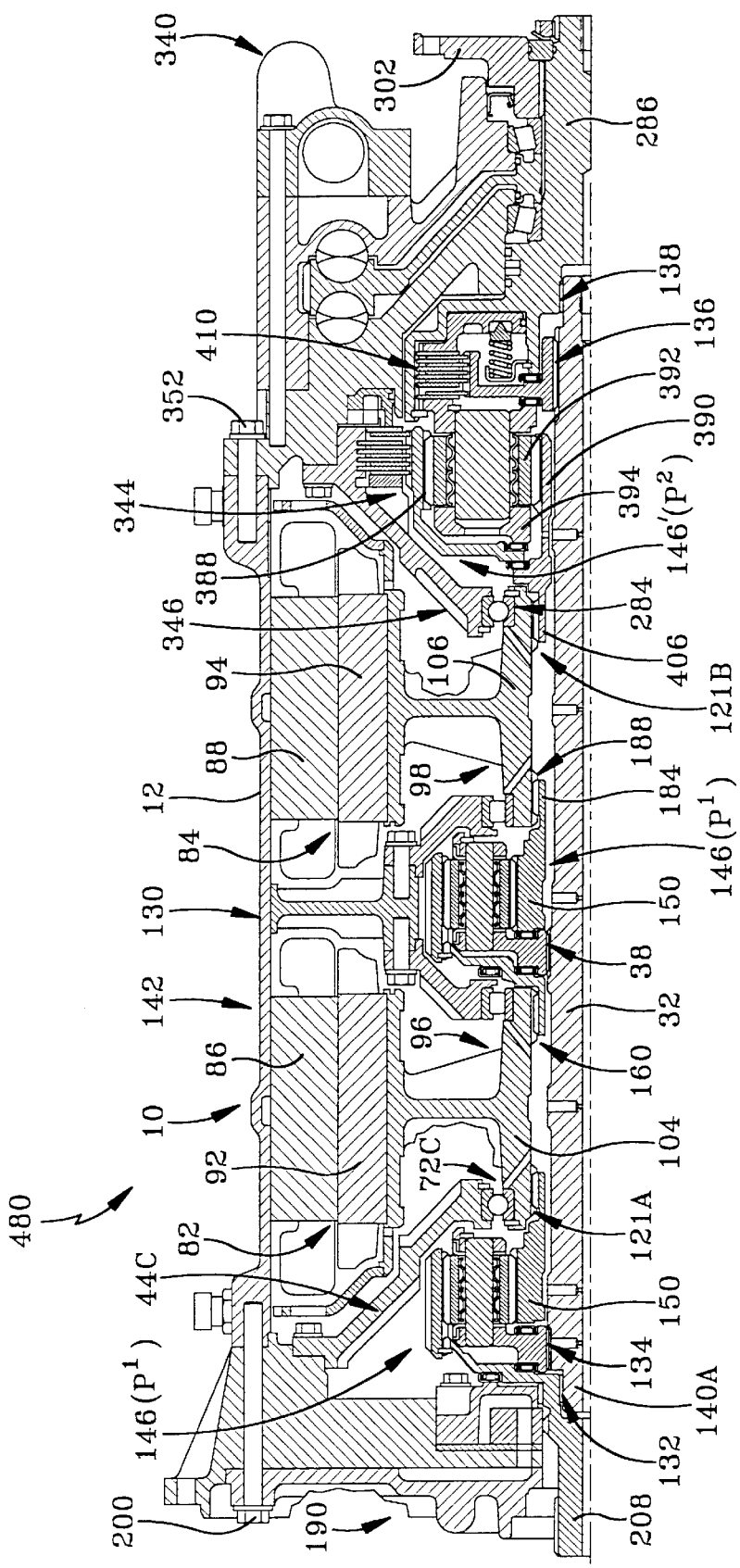
FIG. 15 is a longitudinal cross section of a dual-mode, compound-split transmission that is readily assembled, in conformity with the concepts of the present invention, with the second form of a housing assembly depicted in FIG. 4, the input assembly depicted in FIG. 6 (the planetary gear subset in which is modified pursuant to FIG. 5A) and the output assembly depicted in FIG. 9, said cross section being taken along a plane that extends radially outwardly from the centerline of that transmission.
Figure 16:
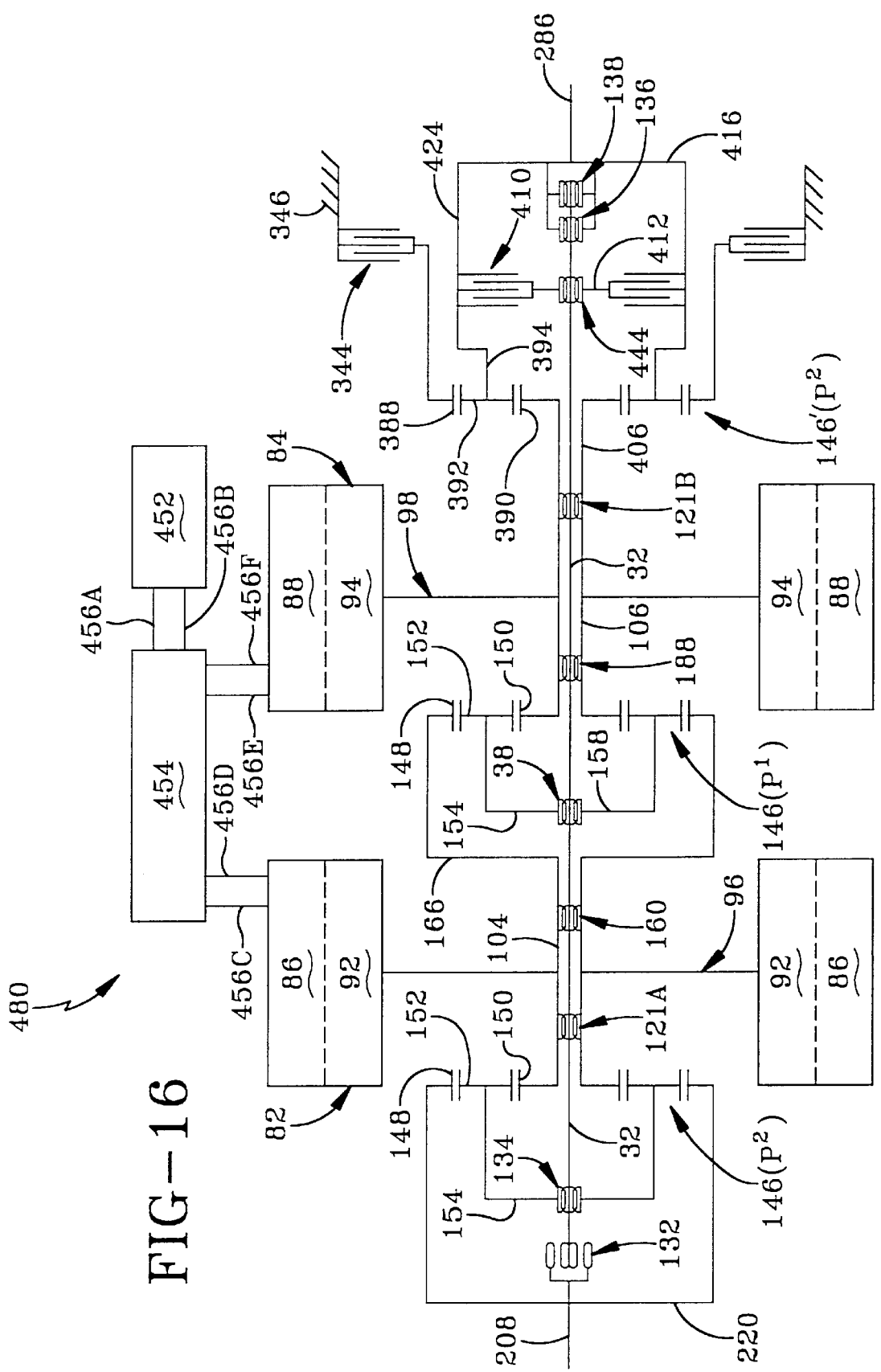
FIG. 16 is a schematic representation of the dual-mode, compound-split transmission diagrammatically depicted in FIG. 15.

With reference to FIGS. 15 and 16, a dual-mode, compound-split transmission 480 is depicted. The modular assembly of a dual-mode compound-split transmission 480 may begin with a housing assembly 142 to which a modified input assembly 190 and an output assembly 340 are operatively connected. The input assembly 190 is modified in that the planetary gear subset 146 is a type $P^1$.

The aforesaid input assembly 190 is connected to rim 20 of casing 12 by bolts 200. When the input assembly 190 is inserted in the first open end 16 of casing 12, the shroud 44C positions the bearing 72C operatively to engage the radially outer side of the inner hub 104 on ring 96 that supports the rotor 92 of the motor/generator 82. The mechanical interface 121A located not only on the radially inner side of hub 104 but also on the sun gear 150 of planetary gear subset 146 (style $P^1$) may be in the nature of a spline operatively to engage those members in order to effect mutual rotation of the rotor 92 in motor/generator 82 and the sun gear 150 in planetary gear subset 146. The interface 132 comprises a bearing to permit the input shaft 208 to rotate relative to the central shaft 32. The interface 134, however, is a spline connection to assure that the carrier 154 in planetary gear subset 146 can only rotate with the central shaft 32.

An output assembly 340 is connected to the rim 22 of casing 12 by bolts 352. When the output sub-assembly 340 is inserted through the second open end 18 of casing 12, the shroud 346 positions the bearing 284 operatively to engage the radially outer side of the hub 106 on ring 98 that supports the rotor 94 of motor/generator 84. The mechanical interface 121B on collar 406 engages interface 121B on the radially inner side of hub 106 to effect a driving connection between the sun gear 390 in planetary gear subset 410 (style $P^2$) and the rotor 94 of motor/generator 84. The interface 136 and 138 are spline connections to assure that the output shaft 286 rotates in unison with the central shaft 32.

Being a hybrid transmission the transmission 470 may utilize power from an electric power source 452. The electric power source 452 (as depicted in FIG. 16) may be one or more batteries, or any other electric power sources that have the ability to provide, or store, and dispense electric power. The electric power source 452 communicates with an electrical control unit (ECU) 454 by electrical transfer conductors 456A and 456B. The ECU 454 communicates with the first motor/generator 82 by electrical transfer conductors 456C and 456D, and the ECU 454 similarly communicates with the second motor/generator 84 by electrical transfer conductors 456E and 456F.

Operation of the subject transmission may not be readily apparent from the description as to its modular assembly so should one desire a more detailed explanation, one may refer to the aforesaid U.S. Pat. No. 5,931,757.

Overview

It is important that one generally understands the mechanism of powertrains that incorporate any of the transmissions that can be modularly assembled in accordance with the concepts of the present invention. To that end powertrains have input members that may be in the nature of a shaft which is directly, or indirectly, driven by an internal combustion engine. When directly driven, the output shaft from engine may be fixedly secured to the input shaft 208 to effect continuous rotation of the input shaft in response to rotation of the output shaft, or it should be understood that clutch mechanism in the nature of torque transfer devices are commonly interposed between the engine and the input shaft 208 to permit a selective connection therebetween. As is also well known to the art, a transient torque damper might well be incorporated between the output shaft of the engine and the input member 208 of the hybrid transmission.

An excellent example of a transient torque damper of the type recommended for the present usage is disclosed in detail in U.S. Pat. No. 5,009,301 which issued on Apr. 23, 1991, to General Motors Corporation. Even if a transient torque damper were to be employed, a torque transfer device in the nature of a clutch could still be desirable to permit selective engagement of the engine with the hybrid transmission, but it must be understood that the torque transfer device is not utilized to change, or control, the mode in which the hybrid transmission operates.

With respect to the transmission itself, the modular construction disclosed herein permits the manufacturer, by the appropriate selection of components, to provide a single-mode, input-split parallel hybrid transmission, a dual-mode, compound-split electromechanical vehicular transmission or even a single-mode, compound-split, parallel, hybrid transmission (constituting the second mode of the aforesaid dual-mode, compound-split transmission). It should now be apparent that all three of the aforesaid transmissions exist as variations of the dual-mode configuration by selectively utilizing the itemized sub-assemblies. The fourth, simple series configuration is achieved by grounding the carrier of the planetary gear subset utilized in the input sub-assembly.

All configurations permit the optional inclusion of a hydrodynamic retarder (a fluid coupling with one side thereof being grounded) for long, downhill braking.

The motor/generator units can be identical with simply mounted shrouds that can be turned and broached to provide higher stiffness and allow an increased number of poles to the motor/generator design that is of significantly reduced diameter and length than possible with prior art transmission constructions. The several planetary gear subsets utilized in the various transmissions assembled pursuant to the concepts of the present invention may also be of virtually identical construction. In addition, all transmissions so assembled may share common electronics. Overall, the various transmission configurations assembled pursuant of the concepts of the present invention provide about a 30% reduction in parts as well as assembly time.

Conclusion

The preferred embodiment of the present invention discloses a new and novel modular technique for assembling a family of vehicular transmissions, including: a simple "series" generator-motor assembly that does not include a mechanical path between the internal combustion engine and the transmission output shaft; a single-mode, input-split transmission; a single-mode, compound-split transmission; and a dual-mode, compound-split transmission. However, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

What is claimed is:

1. Assembling a vehicular transmission from modular components comprising the steps of:
   determining the type of transmission to be assembled;
   providing a housing sub-assembly;
   selecting a central shaft sub-assembly from a family of modular shaft assemblies wherein each member of the family includes a central shaft, one member of the family includes a planetary gear subset operatively connected to said central shaft and another member of the family includes a stabilizer operatively connected to said central shaft, said selected shaft sub-assembly to be appropriate to the transmission to be assembled;
   operatively connecting said selected central shaft sub-assembly to said housing sub-assembly to provide a housing assembly;
   providing an input sub-assembly, said selected input sub-assembly to be appropriate to the transmission to be assembled;
   operatively connecting said input sub-assembly to said housing assembly;
   selecting an output sub-assembly from a plurality of modular output sub-assemblies, said selected output sub-assembly to be appropriate to the transmission to be assembled; and
   operatively connecting said output sub-assembly to said housing assembly to provide a transmission of the type desired.

2. Assembling a vehicular transmission, as set forth in claim 1, comprising the further steps of assembling a housing sub-assembly by:
   providing a tube-like, annular housing having a generally cylindrical interior surface and terminating in first and second end portions, each of which are substantially open;
   providing a partition member having a radially outer, mounting rim and a radially inner, anchor rim;
   securing the radially outer, mounting rim of said partition to the generally cylindrical interior surface in said housing such that said partition member extends transversely of said housing within the medial portion of said housing;
   inserting a first motor/generator having a stator and a rotor with a mounting ring attached to said rotor, said insertion accomplished through one substantially open end of said housing to position said first motor/generator substantially adjacent to one side of said partition;
   securing the stator of said first motor/generator to the cylindrical interior surface of said housing;
   inserting a second motor/generator having a stator and a rotor with a mounting ring attached to said rotor, said insertion accomplished through the other substantially open end of said housing to position said second motor/generator substantially adjacent to the other side of said partition; and
   securing the stator of said second motor/generator to the cylindrical interior surface of said housing.

3. Assembling a vehicular transmission, as set forth in claim 2, wherein:
   said central shaft in each member of said family of shaft sub-assemblies presents a plurality of axially spaced mechanical interfaces;
   each said mechanical interface selected from a group consisting of positive drive connecting means and rotatable connecting means.

4. Assembling a vehicular transmission, as set forth in claim 3, comprising the further step of providing a modular input sub-assembly wherein:
   said modular input sub-assembly includes an end cap, a valve body/pump housing, an input shaft and a shroud secured to said valve body/pump housing;
   said modular input sub-assembly also includes a planetary gear subset consisting of an outer, ring gear, an inner, sun gear and a shaft of a pre-selected diameter in a carrier, said plurality of plurality of planet gears each rotatably mounted on its own support planet gears simultaneously, and meshingly, engaging both said outer, ring gear and said inner, sun gear, said outer ring gear operatively connected to said input shaft, said carrier presenting a positive drive mechanical interface and said inner sun gear also presenting a positive drive mechanical interface;
   the mechanical interfaces on said input shaft and on said carrier, respectively, are operatively engageable by compatible mechanical interfaces on said central shaft when said input sub-assembly is secured to said housing assembly; and
   said positive drive mechanical interface on said inner, sun gear is operatively engageable with the mounting ring of the rotor on one motor/generator in said housing assembly when said input sub-assembly is secured to said housing assembly.

5. Assembling a vehicular transmission, as set forth in claim 4, comprising the further step of selecting an output sub-assembly from a family of modular output sub-assemblies wherein:
   each member of the family includes a main frame, an output shaft and a shroud secured to said main frame;
   at least one member of the family includes a planetary gear subset consisting of an outer, ring gear, an inner, sun gear and a plurality of planet gears each rotatably mounted on a support shaft of a given diameter in a carrier, said plurality of planet gears simultaneously, and meshingly, engaging both said outer, ring gear and said inner, sun gear; said outer ring gear grounded to said shroud; said carrier operatively connected to said output shaft and said inner sun gear operatively engageable with a motor/generator in said housing assembly;

another member of the planetary gear subset family utilizing a plurality of planet support shafts each of a significantly different diameter than in the previously defined member of the planetary gear subset family;

still another member of the family includes the aforesaid planetary gear subset with a first torque transfer device selectively to ground said outer ring gear to said main frame and a second torque transfer device selectively to secure said carrier to said output shaft.

6. Assembling a vehicular transmission, as set forth in claim 5, wherein the type of transmission to be assembled is selected from a family of transmissions comprising:

a simple "series" generator-motor transmission; a single-mode, input-split transmission; a single-mode, compound-split transmission; and, a dual-mode, compound-split transmission.

7. Assembling either a simple "series" generator-motor vehicular transmission or a single-mode, input-split vehicular transmission, as set forth in claim 6, wherein:

the chosen central shaft sub-assembly is that member of the family incorporating a stabilizer;

said stabilizer is operatively connected to said central shaft by a positive drive mechanical interface; and said stabilizer extends conically outwardly to present a mechanical interface that operatively interacts with said housing sub-assembly.

8. Assembling a single-mode, input-split vehicular transmission, as set forth in claim 7, wherein:

the mechanical interface presented from said stabilizer positively interacts with said housing assembly to permit relative rotation between said stabilizer and said housing sub-assembly.

9. Assembling a simple "series" generator-motor vehicular transmission, as set forth in claim 7, wherein:

the mechanical interface presented from said stabilizer positively interacts with said housing assembly to preclude relative rotation between said stabilizer and said housing sub-assembly.

10. Assembling a single-mode, input-split vehicular transmission, as set forth in claim 6, comprising the further steps of:

providing a modular input sub-assembly having an end cap, a valve body/pump housing, an input shaft and a shroud secured to said valve body/pump housing;

said modular input sub-assembly also includes a planetary gear subset consisting of an outer, ring gear, an inner, sun gear and a plurality of planet gears each rotatably mounted on its own support shaft of a pre-selected diameter in a carrier, said plurality of planet gears simultaneously, and meshingly, engaging both said outer, ring gear and said inner, sun gear;

said outer ring gear positively driven by said input shaft;

said inner sun gear presenting a positive drive mechanical interface;

a rotatable mechanical interface on said input shaft and a positive drive mechanical interface on said carrier are operatively engageable by compatible mechanical interfaces on said central shaft when said input sub-assembly is secured to said housing assembly;

the positive drive mechanical interface on said inner, sun gear of the planetary gear subset in said input sub-assembly is operatively engageable with the mounting ring of the rotor on said first motor/generator in said housing assembly when said input sub-assembly is secured to said housing assembly;

selecting an output sub-assembly from a family of modular output sub-assemblies:

the selected output sub-assembly consists of a main frame, an output shaft and a shroud secured to said main frame as well as a planetary gear subset; said shroud rotatably engages the rotor of said second motor/generator to stabilize its rotation;

said planetary gear subset having an outer, ring gear grounded to said shroud; an inner, sun gear operatively connected by a positive drive mechanical interface with the rotor of said second motor/generator; and a carrier connected not only to said central shaft but also to said output shaft by positive drive mechanical interfaces.

11. Assembling a simple "series" generator-motor vehicular transmission, as set forth in claim 9, comprising the further steps of:

providing a modular input sub-assembly having an end cap, a valve body/pump housing, an input shaft and a shroud secured to said valve body/pump housing;

said modular input sub-assembly also includes a planetary gear subset consisting of an outer, ring gear, an inner, sun gear and a plurality of planet gears each rotatably mounted on its own support shaft of a pre-selected diameter in a carrier, said plurality of planet gears simultaneously, and meshingly, engaging both said outer, ring gear and said inner, sun gear;

said outer ring gear positively driven by said input shaft;

said carrier presenting a positive drive mechanical interface interface; and said inner sun gear also presenting a positive drive mechanical a rotatable mechanical interface on said input shaft and a positive drive mechanical interface on said carrier are operatively engageable by compatible mechanical interfaces on said central shaft when said input sub-assembly is secured to said housing assembly;

the positive drive mechanical interface on said inner, sun gear of the planetary gear subset in said input sub-assembly is operatively engageable with the mounting ring of the rotor on said first motor/generator in said housing assembly when said input sub-assembly is secured to said housing assembly;

selecting an output sub-assembly from a family of modular output sub-assemblies wherein:

the output sub-assembly consists of a main frame, an output shaft and a shroud secured to said main frame as well as a planetary gear subset having an outer, ring gear grounded to said shroud, an inner, sun gear operatively connected by a positive drive mechanical interface with the rotor of said second motor/generator; a carrier not only connected to said central shaft by a rotatable annular collar but connected also to said output shaft by a positive drive connecting flange.

12. Assembling a single-mode, compound-split vehicular transmission, as set forth in claim 6, comprising the further steps of:

selecting that member of the central shaft sub-assembly family that includes a planetary gear subset, said planetary gear subset consisting of an outer, ring gear, an inner, sun gear and a plurality of planet gears each rotatably mounted on its own support shaft of a pre-selected diameter in a carrier, said plurality of planet gears simultaneously, and meshingly, engaging both said outer, ring gear and said inner, sun gear; said outer ring gear operatively connected to the rotor of said first motor/generator;

said carrier presenting a positive drive mechanical interface for operatively engaging said central shaft, and said inner sun gear also presenting a positive drive mechanical interface for operatively engaging the rotor of said second motor/generator;

providing a modular input sub-assembly having an end cap, a valve body/pump housing, an input shaft and a shroud secured to said valve body/pump housing;

said modular input sub-assembly also includes a planetary gear subset consisting of an outer, ring gear, an inner, sun gear and a plurality of planet gears each rotatably mounted on its own support shaft of a pre-selected diameter in a carrier, said plurality of planet gears simultaneously, and meshingly, engaging both said outer, ring gear and said inner, sun gear, said outer ring gear operatively connected to said input shaft, said carrier presenting a positive drive mechanical interface for operatively engaging said central shaft and said inner sun gear also presenting a positive drive mechanical interface for operatively engaging the rotor in said second motor/generator;

sel-ecting an output sub-assembly from a family of modular output sub-assemblies;

each member of the family includes a main frame, an output shaft and a shroud secured to said main frame, said shroud rotatably engaging the rotor of said second motor/generator to stabilize its rotation; said output shaft having a positive driving engagement with said central shaft.

13. Assembling a dual-mode, compound-split vehicular transmission, as set forth in claim 6, comprising the further steps of:

providing a modular input sub-assembly having an end cap, a valve body/pump housing, an input shaft and a shroud secured to said valve body/pump housing;

said modular input sub-assembly also includes a planetary gear subset consisting of an outer, ring gear, an inner, sun gear and a plurality of planet gears each rotatably mounted on its own support shaft of a pre-selected diameter in a carrier, said plurality of planet gears simultaneously, and meshingly, engaging both said outer, ring gear and said inner, sun gear, said outer ring gear operatively connected to said input shaft, said carrier presenting a positive drive mechanical interface and said inner sun gear also presenting a positive drive mechanical interface for operatively engaging the rotor of said first motor/generator when said input sub-assembly is connected to said housing assembly;

selecting that member of the central shaft sub-assembly family that includes a planetary gear subset, said planetary gear subset consisting of an outer, ring gear, an inner, sun gear and a plurality of planet gears each rotatably mounted on its own support shaft of a pre-selected diameter in a carrier, said plurality of planet gears simultaneously, and meshingly, engaging both said outer, ring gear and said inner, sun gear:

said outer ring gear operatively connected to said input shaft, said carrier presenting a positive drive mechanical interface and said inner sun gear also presenting a positive drive mechanical interface;

selecting an output sub-assembly from a family of modular output sub-assemblies; said selected output sub-assembly includes a main frame, an output shaft, a shroud secured to said main frame;

a planetary gear subset consisting of an outer, ring gear, an inner, sun gear and a plurality of planet gears each rotatably mounted on its own support shaft of a pre-selected diameter in a carrier, said plurality of planet gears simultaneously, and meshingly, engaging both said outer, ring gear and said inner, sun gear; said output sub-assembly further including a first torque transfer device selectively to ground said outer ring gear of said planetary gear subset in said output sub-assembly to said main frame and a second torque transfer device selectively to secure said carrier to said output shaft.

14. The assembly of various transmission types from a plurality of modular components, the selection of a particular transmission type being made most effectively to accommodate predetermined operational parameters to which the transmission will be subjected, said modular assembly comprising the steps of:

providing a tube-like, annular housing having a generally cylindrical interior surface and terminating in first and second end portions, each of which are substantially open;

providing a partition member having a radially outer, mounting rim and a radially inner, anchor rim;

securing the radially outer, mounting rim of said partition to the generally cylindrical interior surface in said housing such that said partition member extends transversely of said housing within the medial portion of said housing;

determining whether the specific transmission type to be assembled employs a medial planetary gear subset to be disposed within the medial portion of said housing and so positioning said medial planetary gear subset, if appropriate;

securing tapered shrouds to said partition;

inserting a first motor/generator having a stator and a rotor with a mounting ring attached to said rotor through one substantially open end of said housing to be disposed substantially adjacent to said partition;

securing the stator of said first motor/generator to the cylindrical interior surface of said housing;

inserting a second motor/generator having a stator and a rotor with a mounting ring attached to said rotor through the other substantially open end of said housing to be disposed substantially adjacent to the other side of said partition;

securing the stator of said second motor/generator to the cylindrical interior surface of said housing;

selecting at least two planetary gear subsets, the number, and at least one structural detail, depending upon the specific transmission type to be assembled;

each said planetary gear subset having a sun gear member, a ring gear member and a plurality of planet gear members rotatably supported on a carrier simultaneously, and meshingly, to engage said sun and ring gear members;

providing an input sub-assembly to be received in said first open end portion of said housing;

said input sub-assembly having a supporting frame with a central aperture;

positioning an input shaft member through said central aperture in the supporting frame of said input sub-assembly;

operatively securing the ring gear member of the first planetary gear subset to said input shaft member;

assuring that a conical stabilizer is secured to said supporting frame in the input sub-assembly;

securing said input sub-assembly to the first open end of said housing with the conical stabilizer presented therefrom rotatably engaging the mounting ring secured to the rotor of said first motor/generator;

assuring that the carrier of said first planetary gear subset is splined to said central shaft;

providing an output sub-assembly to be received in said second open end portion of said housing;

said output sub-assembly having a supporting frame with a central aperture;

determining whether the specific transmission type to be assembled employs one or more clutch assemblies and if so, mounting said desired clutch, or clutches, on the supporting frame of said output sub-assembly;

determining whether the specific transmission type to be assembled employs a planetary gear subset in said output sub-assembly and if so, mounting said desired planetary gear subset on the supporting frame of said output sub-assembly;

mounting a stabilizer having at least a conical skeleton on the supporting frame of said output sub-assembly;

selecting a modular output shaft appropriate to the particular transmission being assembled;

positioning said selected modular output shaft through said central aperture of the supporting frame for said output sub-assembly;

securing said output sub-assembly to the second open end of said housing with the conical stabilizer secured to the supporting frame of said output sub-assembly engaging the mounting ring secured to the rotor of said second motor/generator and with the modular output shaft directly connected to the carrier of the second planetary gear subset.

\* \* \* \* \*